(12) United States Patent
Kaneko et al.

(10) Patent No.: US 6,919,948 B2
(45) Date of Patent: Jul. 19, 2005

(54) LIQUID CRYSTAL PANEL, MANUFACTURING METHOD THEREFOR, AND ELECTRONIC EQUIPMENT

(75) Inventors: Hideki Kaneko, Shiojiri (JP); Yoshio Yamaguchi, Matsumoto (JP); Kimihiro Nomura, Chino (JP); Chihiro Tanaka, Matsumoto (JP); Motohiro Kamijima, Nagano-ken (JP)

(73) Assignee: Seiko Epson Corporation (JP)

( * ) Notice: Subject to any disclaimer, the term of this patent is extended or adjusted under 35 U.S.C. 154(b) by 92 days.

(21) Appl. No.: 10/233,059

(22) Filed: Aug. 30, 2002

(65) Prior Publication Data

US 2003/0053022 A1 Mar. 20, 2003

(30) Foreign Application Priority Data

Aug. 31, 2001 (JP) ........................................ 2001-264731

(51) Int. Cl.[7] ............................................ G02F 1/1345
(52) U.S. Cl. ........................ 349/152; 349/149; 349/151; 349/153; 349/154
(58) Field of Search ................................. 349/149, 151, 349/152, 153, 154

(56) References Cited

U.S. PATENT DOCUMENTS

| | | | | |
|---|---|---|---|---|
| 5,042,917 A | * | 8/1991 | Fujita et al. | 349/50 |
| 5,519,524 A | * | 5/1996 | Fergason et al. | 349/149 |
| 5,556,670 A | * | 9/1996 | Mihara et al. | 428/1.5 |
| 2001/0022640 A1 | * | 9/2001 | Nakahara | 349/123 |
| 2003/0164907 A1 | * | 9/2003 | Date et al. | 349/113 |

FOREIGN PATENT DOCUMENTS

| | | | | |
|---|---|---|---|---|
| JP | 57-82321 | 11/1982 | | |
| JP | 6-69937 | 9/1994 | | |
| JP | 10-062793 | 3/1998 | | |
| JP | 10-333165 | 12/1998 | | |
| JP | 2001215524 A | * 8/2001 | ......... | G02F/1/1345 |
| JP | 2002-365653 | 12/2002 | | |

OTHER PUBLICATIONS

Communication from Japanese Patent Office regarding counterpart application.

* cited by examiner

Primary Examiner—Tarifur R. Chowdhury
Assistant Examiner—Michael H Caley
(74) Attorney, Agent, or Firm—Harness, Dickey & Pierce, P.L.C.

(57) ABSTRACT

A liquid crystal panel 1 has a configuration in which an element substrate 10 including routing wiring 16 and a counter substrate 20 including scanning lines 25 are adhered with a sealing material 30 therebetween and, in addition, a liquid crystal is injected between both substrates through a liquid crystal injection hole 30a formed in the sealing material 30. The scanning lines 25 are brought into conduction with the routing wiring 16 through conducting particles 32 dispersed in the sealing material 30. However, the scanning lines 25, which have end portions reaching the neighborhood of the liquid crystal injection hole 30a, among the plurality of scanning lines 25, are brought into conduction with the routing wiring 16 through conducting particles 32 dispersed in a vertical conduction portion 37 or through the conducting particles 32 in both the sealing material 30 and the vertical conduction portion 37.

19 Claims, 14 Drawing Sheets

LIQUID CRYSTAL PANEL, MANUFACTURING METHOD THEREFOR, AND ELECTRONIC EQUIPMENT

BACKGROUND OF THE INVENTION

1. Technical Field of the Invention

The present invention relates to a liquid crystal panel, a manufacturing method therefor, and electronic equipment using the liquid crystal panel.

2. Description of the Related Art

It is generally known that the liquid crystal panel includes a liquid crystal between a pair of substrates adhered with a sealing material therebetween. In such a sort of liquid crystal panel, an electrode is formed on the surface facing the other substrate among individual substrates. A voltage in accordance with the image to be displayed is applied to this electrode through a routing wiring connected to the electrode.

Furthermore, a configuration in which the routing wiring connected to the electrodes of both substrates have been formed intensively on one substrate has also been suggested. That is, in this configuration, the electrode formed on the one substrate is connected to the routing wiring formed on the other substrate through, for example, conducting particles dispersed in the sealing material. According to this, since it is sufficient that the IC chip for driving liquid crystal, the flexible wiring substrate, etc., are mounted on one substrate on which the routing wiring have been formed, it is possible to achieve simplification of the configuration of the liquid crystal panel and narrowing of a so-called picture frame region. Hereafter, conduction between the wiring (electrode) on one substrate and the routing wiring on the other substrate is denoted as "vertical conduction".

In the manufacturing process of a liquid crystal panel, generally, a liquid crystal is injected into the inside of a liquid crystal cell made of a pair of substrates adhered with a sealing material therebetween through a liquid crystal injection hole formed in the sealing material and, thereafter, the liquid crystal injection hole is sealed by a sealing agent. However, when the configuration, in which the wiring formed on both substrates are brought into vertical conduction with each other, is adopted, the liquid crystal injection hole has to be formed while avoiding the portion used for vertical conduction (that is, the portion where the wiring holding conducting particles therebetween face each other) in the sealing material. This is because the conducting particles cannot be placed in the portion corresponding to the liquid crystal injection hole between both substrates, and the wiring formed on both substrates cannot be brought into vertical conduction with each other. As described above, when vertical conduction between the substrates is adopted, the space where the liquid crystal injection hole is to be formed in the sealing material is restricted.

On the other hand, in the general manufacturing process for the liquid crystal panel, in order to improve productivity, a method, in which the liquid crystal is injected into a plurality of liquid crystal cells by one operation, is adopted. That is, regarding a plurality of liquid crystal cells joined in a row, the liquid crystal injection holes are formed while being aligned on one of the sides holding the alignment direction of each liquid crystal cell therebetween, and all liquid crystal injection holes of the liquid crystal cells are immersed in the liquid crystal at the same time. However, when the positions of the liquid crystal injection holes are restricted accompanying adoption of vertical conduction, the configuration, in which the liquid crystal injection holes are formed while being aligned on one of the sides with respect to all liquid crystal cells, cannot always be adopted. As a result, a reduction of productivity may occur.

The present invention was made in consideration of the circumstances described above. It is an object of the present invention to provide a liquid crystal panel capable of bringing wiring formed on both substrates into vertical conduction with each other with reliability regardless of the position of a liquid crystal injection hole formed in a sealing material, and to provide a manufacturing method therefor and electronic equipment using the liquid crystal panel.

SUMMARY OF THE INVENTION

In order to overcome the aforementioned problems, a liquid crystal panel according to the present invention includes a liquid crystal between a first substrate having a plurality of first wiring and a second substrate having a plurality of second wiring, and is provided with a sealing material which is held between the first substrate and the second substrate. The sealing material has a liquid crystal injection hole for injecting the liquid crystal between both substrates, and includes conducting particles dispersed therein. The sealing material is interposed in the portion where the plurality of first wiring and the plurality of second wiring face each other. A vertical conduction portion is installed in the neighborhood of the liquid crystal injection hole (but offset therefrom) in a location surrounded by the sealing material. The vertical conduction portion includes conducting particles dispersed therein and is interposed in the portion where the plurality of first wiring and the plurality of second wiring face each other.

According to this liquid crystal panel, all of the first wiring and the second wiring are brought into vertical conduction with reliability regardless of the position of the liquid crystal injection hole formed in the sealing material. That is, for example, when the wiring which are not vertically conductively connected by the conducting particles dispersed in the sealing material, such as wiring which reach the portion where the sealing material is omitted to form the liquid crystal injection hole, and the wiring which are not always brought into adequate vertical conduction by the conducting particles dispersed in the sealing material, such as wiring which reach the neighborhood of the liquid crystal injection hole, vertical conduction is achieved with reliability by the conducting particles dispersed in the vertical conduction portion. That is, in the liquid crystal panel according to the present invention, even when the liquid crystal injection hole is formed along the edge of the sealing material, which is also used for vertical conduction, the first wiring and the second wiring can be brought into vertical conduction with reliability.

Specifically, when the aforementioned plurality of first wiring extend in the direction from one edge having the liquid crystal injection hole formed in the sealing material toward the other edge facing the one edge in a display region, it is considered that among the aforementioned plurality of first wiring, at least one aforementioned first wiring, the end portion of which reaches the position corresponding to the aforementioned liquid crystal injection hole on the aforementioned first substrate and which does not face the aforementioned sealing material, includes a portion facing the aforementioned second wiring with the aforementioned vertical conduction portion therebetween. According to this, with respect to the plurality of first wiring or the plurality of second wiring, all the wiring including the wiring which do not have any portion facing the other with the sealing material therebetween, are brought into vertical conduction with reliability.

On the other hand, among the plurality of first wiring or the plurality of second wiring, even when the wiring have a portion facing the wiring of the other with the sealing material therebetween, regarding the wiring, the end portions of which have reached the neighborhood of the liquid crystal injection hole, it is also considered that the area facing the sealing material (that is, the area of the portion which becomes a target for vertical conduction by the conducting particles in the sealing material) may not be ensured adequately.

In particular, for example, when the sealing material is formed using a printing technique, since the deviation of the position of formation thereof is relatively large, such a problem may become more pronounced. Consequently, when the aforementioned plurality of first wiring are specified to be the wiring extending in the direction from one edge having the liquid crystal injection hole of the sealing material toward the other edge facing the one edge in a display region, it is desirable that among the plurality of first wiring, at least one first wiring, the end portion of which is located in the neighborhood of the aforementioned liquid crystal injection hole, includes a portion facing the aforementioned second wiring with the aforementioned vertical conduction portion therebetween. In other words, a wiring which extends to a location immediately adjacent the liquid crystal injection hole may not receive adequate conductive sealing material to ensure reliable conductive connectability. As such, the vertical conduction portion is also formed on this wiring.

In the liquid crystal injection step of the manufacturing process of the liquid crystal panel, when a liquid crystal is rapidly injected into the liquid crystal cell, it may happen that, for example, the orientation state of the orientation film covering the substrate is broken by the flow of the liquid crystal. Consequently, in the present invention, it is desirable that the aforementioned vertical conduction portion is installed so that its major axis (i.e., its greatest length) extends in the direction of the edge having the aforementioned liquid crystal injection hole formed in the sealing material. According to this, since the flow of the liquid crystal injected through the liquid crystal injection hole is temporarily hindered by the vertical conduction portion, its flow can be suppressed while the liquid crystal is rapidly injected into the liquid crystal cell.

On the other hand, if the vertical conduction portion is installed integrally with the sealing material (so that it is joined to the sealing material), the flow of the liquid crystal may become stagnant at the joint portion and, therefore, the liquid crystal may not be quickly injected into the liquid crystal cell. Consequently, in the present invention, it is desirable that the vertical conduction portion is installed at a distance (i.e., spaced apart) from the sealing material.

When the aforementioned vertical conduction portion is made of the same material as that of the aforementioned sealing material, since the vertical conduction portion can be formed concurrently during the sealing material formation step, simplification of the manufacturing step and reduction of manufacturing costs can be achieved. In order to achieve vertical conduction with reliability through the conducting particles dispersed in the sealing material and the vertical conduction portion, it is desirable that the widths of the portions of the facing the aforementioned sealing material or vertical conduction portion plurality of first wiring and the plurality of second wiring are made larger than the widths of the other portions of the first and second wiring.

When the aforementioned plurality of first wiring extend in the direction from one edge, on which the liquid crystal injection hole has been formed, toward the other edge facing the one edge in a display region, it is desirable that the plurality of first wiring have portions facing alternately any one of the one edge of the aforementioned sealing material or the aforementioned vertical conduction portion and the other edge of the aforementioned sealing material on a wiring basis. According to this, since it can be avoided that the second wiring which are brought into vertical conduction to the first wiring with the sealing material or the vertical conduction portion therebetween are unevenly distributed on only one side of the substrate, further simplification of the configuration can be achieved in such a manner that, for example, the picture frame region can be made to take a bilaterally symmetrical shape.

a. It is also considered that the liquid crystal panel according to the present invention has a configuration provided with a plurality of third wiring which are formed on the aforementioned second substrate and which extend in the direction intersecting the aforementioned first wiring, a plurality of pixel electrodes facing the aforementioned first wiring in the display region, and a plurality of two-terminal type nonlinear elements connected to the aforementioned third wiring and the aforementioned pixel electrodes.

In order to overcome the aforementioned problems, electronic apparatus according to the present invention is provided with the aforementioned liquid crystal panel. As described above, by the liquid crystal panel according to the present invention, the first wiring and the second wiring can be brought into conduction with reliability regardless of the position of the liquid crystal injection hole. Consequently, according to the electronic apparatus provided with this liquid crystal panel, failures in vertical conduction is suppressed and, therefore, excellent display quality is realized.

A manufacturing method for a liquid crystal panel according to the present invention is a method in which a first substrate having a plurality of first wiring and a second substrate having a plurality of second wiring are adhered with a sealing material therebetween, a liquid crystal is injected between both substrates through the liquid crystal injection hole formed in the sealing material and, therefore, the liquid crystal panel is manufactured, and includes the steps of forming the sealing material with conducting particles therein and interposing the sealing material in the portion, at which the aforementioned plurality of first wiring and the aforementioned plurality of second wiring face each other, on the aforementioned first substrate or the aforementioned second substrate, forming a vertical conduction portion in the neighborhood of (i.e., adjacent) the aforementioned liquid crystal injection hole and in a region surrounded by the aforementioned sealing material, the vertical conduction portion including conducting particles dispersed therein, at which the aforementioned plurality of first wiring and the aforementioned plurality of second wiring face each other and adhering the aforementioned first substrate and the aforementioned second substrate with the aforementioned sealing material and the aforementioned vertical conduction portion therebetween. According to the liquid crystal panel produced by this method, since vertical conduction of the wiring can be achieved by not only the sealing material, but also the vertical conduction portion, conduction failure can be effectively suppressed.

Furthermore, a manufacturing method for a liquid crystal panel according to the present invention is a method in which a liquid crystal is encapsulated in a liquid crystal cell made by adhering a first substrate and a second substrate with a sealing material therebetween through a liquid crystal injection hole formed in the sealing material and, therefore, the liquid crystal panel is manufactured, and includes the steps of forming a plurality of first wiring extending in the direction from one edge of the sealing material, in which the aforementioned liquid crystal injection hole is to be formed, toward the other edge facing the one edge in every first substrate region corresponding to each of a plurality of first substrates in a first original base material, forming a plurality of second wiring, a plurality of third wiring extending in the direction intersecting the aforementioned first wiring, a plurality of pixel electrodes facing the aforementioned first wiring in a display region, a plurality of two-terminal type nonlinear elements connected to the aforementioned third wiring and the aforementioned pixel electrodes, and common wiring which electrically connect the plurality of third wiring with each other in the second substrate region under the condition before a second original base material is partitioned along the boundaries to each of the second substrate regions and the regions adjacent to the second substrate regions in the extension direction of the third wiring, in every second substrate region corresponding to each of the aforementioned plurality of second substrates in the second original base material, forming the sealing material, in which conducting particles to be interposed in the portion where the aforementioned plurality of first wiring and the aforementioned plurality of second wiring face each other are dispersed and which has the aforementioned liquid crystal injection hole facing in the same direction in each of the plurality of aforementioned first substrate regions or the plurality of aforementioned second substrate regions aligned in a row in the extension direction of the aforementioned third wiring, in the aforementioned first substrate region or the aforementioned second substrate region, forming a vertical conduction portion, which is located in the neighborhood of the aforementioned liquid crystal injection hole and in a region substantially surrounded by the aforementioned sealing material and in which conducting particles to be interposed in the portion where the aforementioned first wiring and second wiring are facing each other are dispersed, in the aforementioned first substrate region or the aforementioned second substrate region, forming a liquid crystal cell group, in which a plurality of liquid crystal cells are joined sequentially, by adhering the aforementioned first original base material and the aforementioned second original base material with the aforementioned sealing material and the aforementioned vertical conduction portion therebetween under the condition that the aforementioned first substrate region and the aforementioned second substrate region face each other, injecting the liquid crystal into each of the plurality of liquid crystal cells joined sequentially in the extension direction of the aforementioned third wiring so as to constitute the aforementioned liquid crystal cell group through the liquid crystal injection hole of the aforementioned sealing material by one operation, and partitioning the aforementioned liquid crystal cell group into individual liquid crystal cells and, in addition, electrically partitioning the plurality of third wiring connected to the aforementioned common wiring into individuals in each liquid crystal cell.

According to this manufacturing method as well, effects similar to those in the aforementioned manufacturing method are achieved. Furthermore, according to the present manufacturing method, since the plurality of third wiring in the second substrate region are connected to each other by the common wiring before portioning into individual liquid crystal cells, there is an advantage that electrostatic discharge damage to the two-terminal type nonlinear element is prevented. These third wiring are partitioned on a liquid crystal cell basis and, at the same time, are partitioned electrically. Consequently, in order to prevent the electrostatic discharge damage to the two-terminal type nonlinear element during the step of injecting the liquid crystal into the liquid crystal cell, a plurality of liquid crystal cells have to be joined to each other in the extension direction of the third wiring before being subjected to this step. In consideration of these circumstances, it can be said that the position, at which the liquid crystal injection hole is to be formed, is desirably not in the edge orthogonal to the extension direction of the third wiring of the sealing material, but in the edge parallel to the extension direction of the third wiring. On the other hand, the edge parallel to the extension direction of the third wiring of the sealing material is the edge to be used for vertical conduction between the first wiring and the second wiring. Herein, in the present invention, since vertical conduction between the first wiring and the second wiring is achieved by the vertical conduction portion in addition to the sealing material, there is an advantage in that even the wiring which cannot be brought into vertical conduction by the sealing material because the sealing material terminates at the liquid crystal injection hole, vertical conduction can be achieved with reliability by the vertical conduction portion.

In these manufacturing methods, it is desirable that the aforementioned sealing material and the vertical conduction portion are formed in a single step from the same material. According to this, simplification of the manufacturing step and reduction of the manufacturing cost can be achieved.

DETAILED DESCRIPTION OF THE PREFERRED EMBODIMENTS

One embodiment according to the present invention will be described below with reference to the drawings. Such an embodiment shows one mode of the present invention, does not limit the present invention, and can be arbitrarily modified in the scope of the present invention.

A: Configuration of Liquid Crystal Panel

Figure 1:
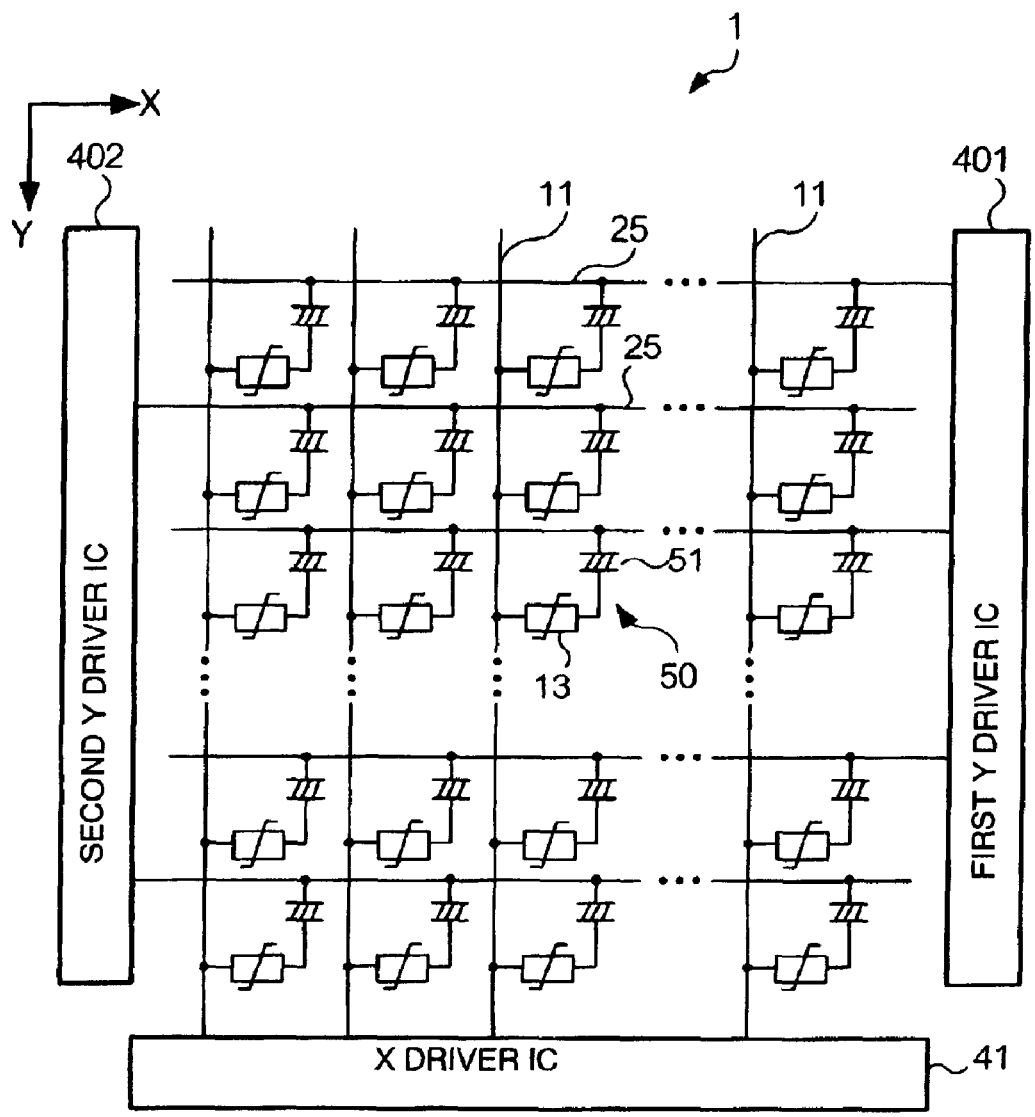
FIG. 1 is a block diagram showing the electrical configuration of a liquid crystal panel according to the present invention.

A mode, in which the present invention is applied to a reflective liquid crystal panel of active matrix system provided with a TFD (Thin Film Diode) as a switching element, will be described. FIG. 1 is a block diagram showing the electrical configuration of a liquid crystal panel according to the present embodiment. As shown in the drawing, this liquid crystal panel 1 includes a plurality of scanning lines 25 extending in the X direction, a plurality of data lines 11 extending in the Y direction, and subpixels 50 installed at each intersection of the scanning lines 25 and the data lines 11. Odd-numbered scanning lines 25 when counted from top in FIG. 1 (hereafter simply denoted as "odd-numbered scanning line") among the plurality of scanning lines 25 are connected to a first Y driver IC 401. On the other hand, even-numbered scanning lines 25 when counted from top in FIG. 1 (hereafter simply denoted as "even-numbered scanning line") are connected to a second Y driver IC 402. Hereafter, when there is no need to specifically differentiate the first Y driver IC 401 and the second Y driver IC 402, these are simply denoted as "Y driver IC 40". On the other hand, each data line 11 is connected to an X driver IC 41. Each of the plurality of subpixels 50 arranged in the shape of a matrix corresponds to one of the colors R (red), G (green), and B (blue). Each subpixel 50 has a configuration in which a liquid crystal display element 51 and a TFD element 13 are connected in series.

Figure 2:
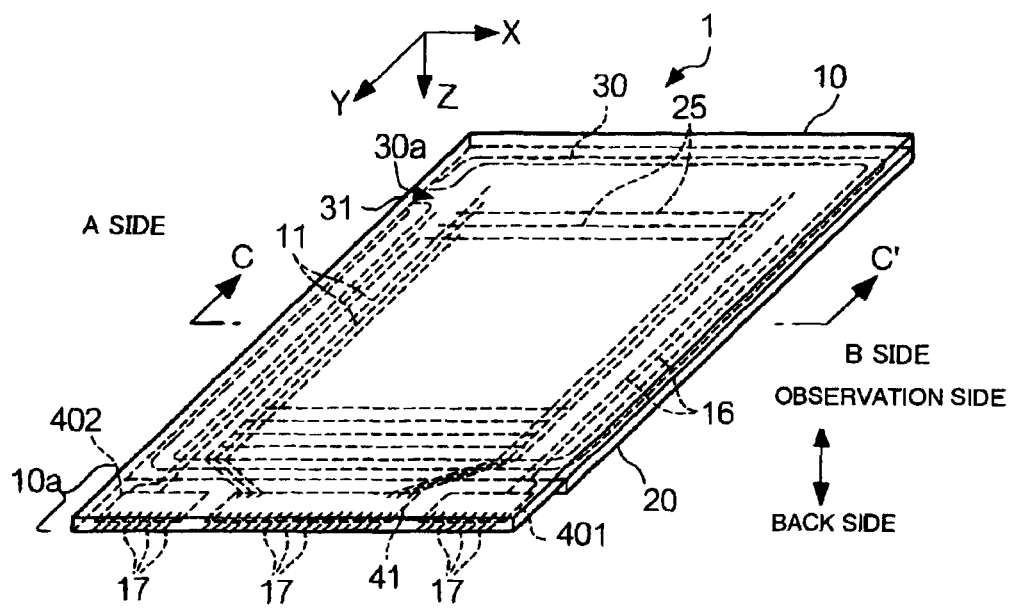
FIG. 2 is a perspective view showing an appearance of the liquid crystal panel when viewed from the observation side.
Figure 3:
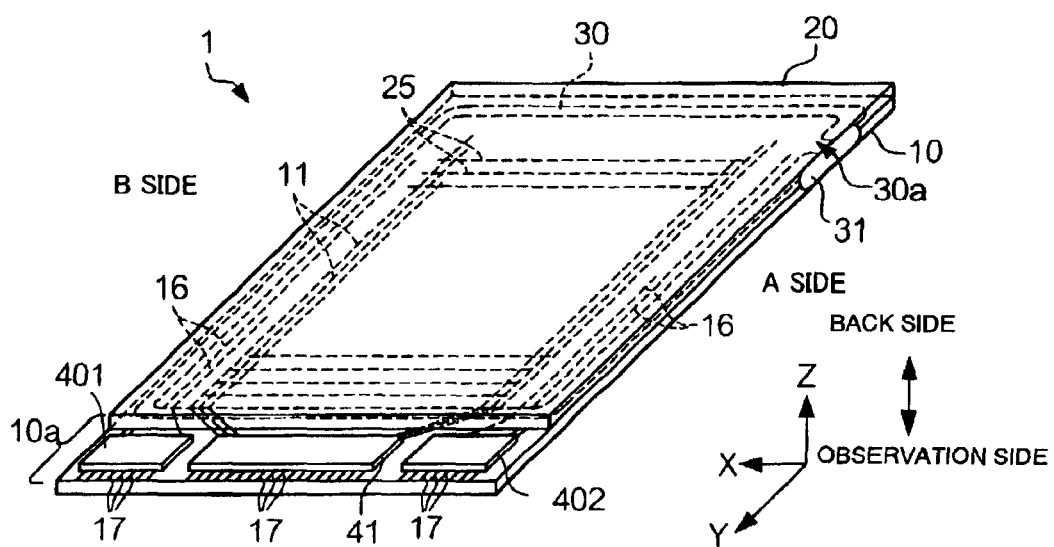
FIG. 3 is a perspective view showing an appearance of the liquid crystal panel when viewed from the back side.

FIG. 2 is a perspective view showing the configuration of a liquid crystal panel 1 according to the present embodiment when viewed from the observation side (the side on which an observer who visually identifies the displayed image should be located). FIG. 3 is a perspective view showing the configuration of this liquid crystal panel 1 when viewed from the back side (that is, the side opposite to that in FIG. 2). Hereafter, as shown in FIG. 2 and FIG. 3, the negative direction of the X axis is denoted as "A side", and the positive direction is denoted as "B side".

As shown in FIG. 2 and FIG. 3, the liquid crystal panel 1 has a configuration in which an element substrate 10 and a counter substrate 20 facing each other are adhered by a sealing material 30, and a liquid crystal (illustration is omitted in FIG. 2 and FIG. 3) is encapsulated in the region surrounded by both substrates and the sealing material 30. The sealing material 30 is formed in the shape of a nearly rectangular frame along the side edge of the counter substrate 20. However, an opened portion for encapsulating the liquid crystal (hereafter denoted as "liquid crystal injection hole") 30a is formed at a part of the one edge extended in the Y direction of the sealing material 30. This liquid crystal injection hole 30a is sealed by a sealing agent 31 after the liquid crystal is injected. Furthermore, conducting particles having conductivity are dispersed in the sealing material 30. These conducting particles are, for example, plastic particles, to which a metal plating has been applied, and resin particles having conductivity, and are concurrently provided with a function of bringing the wiring formed on each of the element substrate 10 and the counter substrate 20 into vertical conduction with each other, and a function of keeping the gap between both substrates (cell gap) constant. In practice, although a polarizing plate for polarizing incident light, a phase difference plate for compensating the interference color, etc., are appropriately adhered on the outer surfaces of the element substrate 10 and the counter substrate 20, since there is no direct relation with the present invention, illustrations and explanations thereof are omitted.

The element substrate 10 and the counter substrate 20 are plate-shaped members having translucency, for example, glass, quartz, and plastic. Among them, on the inside (liquid crystal side) surface of the element substrate 10 located on the observation side, the aforementioned plurality of data lines 11 are formed. On the other hand, a plurality of scanning lines 25 are formed on the inside surface of the counter substrate 20 located on the back side. The element substrate 10 includes a region overhanging from the outer perimeter edge of the sealing material 30 toward one side (that is, the region which does not face the sealing material 30 and the liquid crystal, and hereafter denoted as "edge side region") 10a. The X driver IC 41 is mounted in the neighborhood of the center portion in the X direction of the edge side region 10a, and the first Y driver IC 401 and the second Y driver IC 402 are mounted at positions facing each other with the X driver IC 41 therebetween in the X direction by individually using a COG (Chip On Glass) technique. That is, these driver ICs are joined on the element substrate 10 with an anisotropic conductive film, in which conducting particles are dispersed in an adhesive, therebetween. A plurality of pads 17 are formed in the neighborhood of the edge end portion of the element substrate 10 in the edge side portion 10a and, in addition, one end of a flexible substrate (not shown in the drawing) is joined to the neighborhood of the part on which each pad is formed. External equipment, for example, a circuit substrate, is joined to the other end of this flexible substrate.

Under such a configuration, the X driver IC 41 generates data signals in accordance with the signals input from the external equipment through the flexible substrate and the pads 17, and outputs them to the data lines 11. On the other hand, the Y driver IC 40 generates scanning signals in accordance with the signals input from the external equipment through the flexible substrate and the pads 17, and outputs them. Although the details will be described later, this scanning signal is given from a routing wiring 16 formed on the element substrate 10 to each scanning line 25 on the counter substrate 20 through conducting particles in the sealing material 30.

Figure 4:
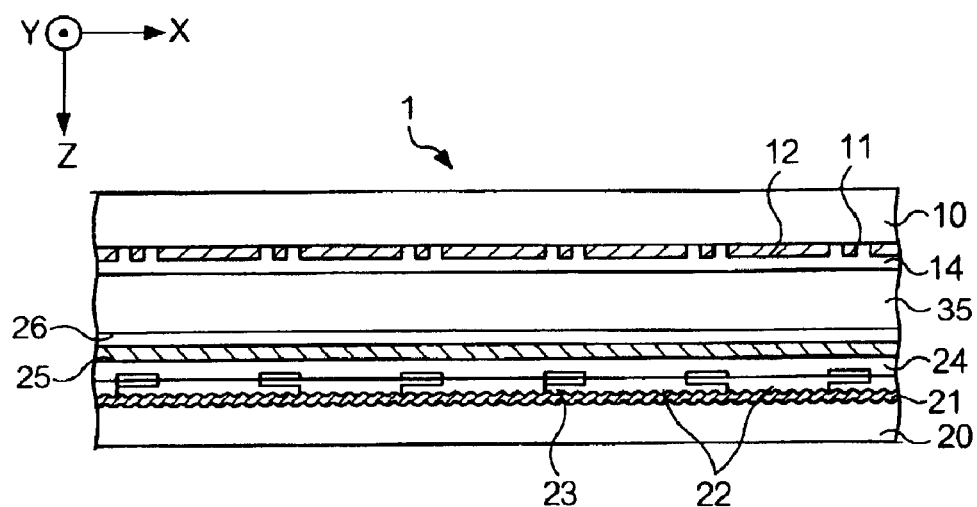
FIG. 4 is a sectional view showing the configuration in a display region of the liquid crystal panel.

The configuration in the region surrounded by the inner perimeter edge of the sealing material 30 (hereafter denoted as "display region") in the liquid crystal panel 1 will be described. FIG. 4 is a diagram showing a cross section portion of the display region when viewed from the line C–C' shown in FIG. 2. As shown in FIG. 4, the aforementioned plurality of data lines 11 and the plurality of pixel electrodes 12 are formed on the inside (liquid crystal 35 side) surface of the element substrate 10.

Figure 5:
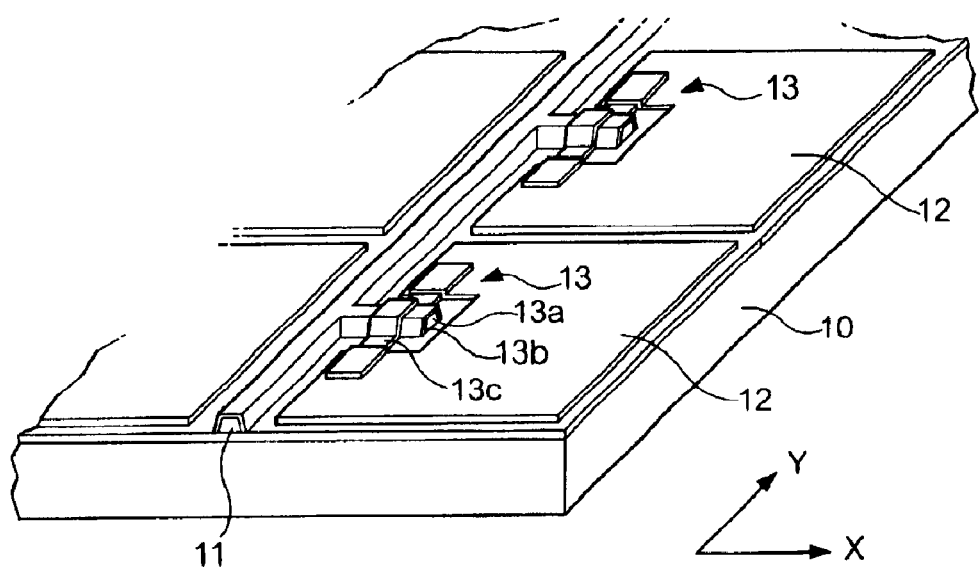
FIG. 5 is a perspective view showing the configuration on an element substrate of the liquid crystal panel.

FIG. 5 is a perspective view showing the configuration of the elements formed on the element substrate 10. It should be noted that FIG. 4 and FIG. 5 are in an inverse relationship with respect to the vertical direction. As shown in the aforementioned drawing, the pixel electrodes 12 are nearly rectangular electrodes formed from a transparent conductive material, for example, ITO (Indium Tin Oxide), and are arranged in the shape of a matrix on the element substrate 10. On the other hand, the data lines 11 are wiring extending in the Y direction in gap portions between individual pixel electrodes 12. Each pixel electrode 12 and the data line 11 adjacent to the pixel electrode 12 on one side are connected with the TFD element 13. Each TFD element is composed of a first metal film 13a which is a portion branched from the data line 11, an oxide film 13b which is formed on the surface of this first metal film 13a by anodic oxidation and which is an insulator, and a second metal film 13c formed on the upper surface of the oxide film 13b from, for example, chromium, and is a two-terminal type nonlinear element having a nonlinear current-voltage characteristic. The second metal film 13c of this TFD element 13 is connected to the pixel electrode 12.

As shown in FIG. 4, the surface of the element substrate 10, on which the data lines 11, pixel electrodes 12, and TFD elements 13 are formed, is covered with an orientation film 14 (not shown in FIG. 5). This orientation film 14 is an organic thin film made of polyimide, etc., and has been subjected to a rubbing treatment for regulating the orientation direction of the liquid crystal 35 when no voltage is applied.

On the other hand, as shown in FIG. 4, a reflection layer 21, color filters 22, a lightproof layer 23, an overcoat layer 24, a plurality of scanning lines 25, and an orientation film 26 are formed on the surface of the counter substrate 20.

The reflection layer 21 is a thin film formed from a metal having a light reflection property, for example, aluminum and silver. The light incident from the observation side into the liquid crystal panel 1 is reflected at the surface of this reflection layer 21, and is emitted to the observation side and, thereby, a so-called reflective display is realized. Herein, as shown in FIG. 4, the region covered with the reflection layer 21 in the inner surface of the counter substrate 20 is a rough surface on which many of fine crest portions (protrusions) and trough portions (dents or recesses) are formed. Consequently, on the surface of the reflection layer 21 formed in the shape of a thin film in order to cover such a rough surface, fine crest portions and trough portions incorporating the rough surface (that is, a scattering structure) are formed. As a result, since the incident light from the observation side is reflected at the surface of the reflection layer 21 in the condition of being scattered moderately, specular reflection at the surface of the reflection layer 21 is avoided and, therefore, a wide viewing angle is realized.

The color filter 22 is a layer formed on the reflection layer 21 corresponding to each subpixel 50 shown in the aforementioned FIG. 1, and is colored in one of R (red), G (green), and B (blue) by a dye or pigment. A pixel (dot) of the display image is composed of three subpixels 50 corresponding to colors which are different from each other. The lightproof layer 23 is formed into the shape of a lattice corresponding to the gap portions of the pixel electrodes 12 arranged in the shape of a matrix on the element substrate 10, and plays a roll in shielding the gaps between individual pixel electrodes 12 from light. As shown in FIG. 4, the lightproof layer 23 in the present embodiment has a configuration in which color filters 22 for three colors R, G, and B are laminated. The overcoat layer 24 is a layer for flattening height differences on the upper surface of the color filters 22 and the lightproof layer 23, and is formed from a resin material of, for example, epoxy-based and acryl-based materials.

The scanning lines 25 are band-shaped electrodes formed from a transparent conductive material, for example, ITO, on the surface of the overcoat layer 24. Each scanning line 25 is formed while being extended in the X direction in order to face the plurality of pixel electrodes 12 aligned in a row in the X direction on the element substrate 10. Consequently, the liquid crystal display element 51 shown in the aforementioned FIG. 1 is configured by the pixel electrode 12, the scanning line 25 facing this, and the liquid crystal 35 held therebetween.

a. That is, when the TFD elements 13 are applied with a voltage equivalent to or larger than the threshold by supplying scanning signals to the scanning lines 25 and, in addition, supplying data signals to the data lines 11, the TFD elements 13 switch to the ON condition. As a result, charge is accumulated in the liquid crystal display element 51 connected to the TFD element 13 and, therefore, the orientation direction of the liquid crystal 35 is changed. By thus changing the orientation direction of the liquid crystal 35 on a subpixel 50 basis, a desired display can be performed. On the other hand, after the charge is accumulated, even when the TFD element 13 switches to the OFF condition, the accumulation of charge in the liquid crystal display element 51 is maintained.

The surface of the overcoat layer 24 on which the plurality of scanning lines 25 have been formed is covered with the orientation film 26 similar to the orientation film 14 on the element substrate 10.

Figure 6:
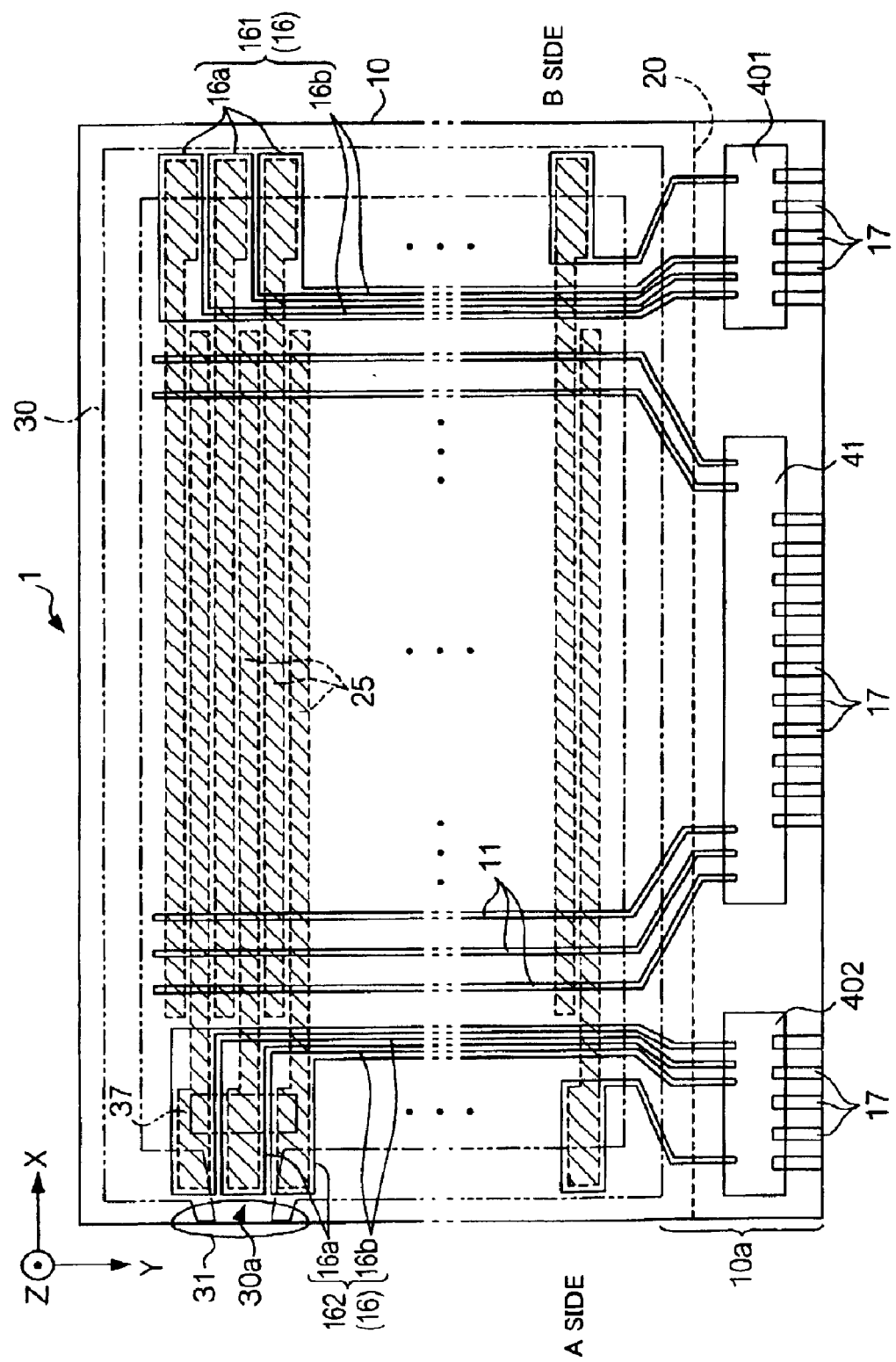
FIG. 6 is a plan view showing the mode of wiring in the liquid crystal panel.

Next, a mode of wiring in the liquid crystal panel 1 according to the present embodiment will be described with reference to FIG. 6. FIG. 6 corresponds to a plan view of the liquid crystal panel 1 when viewed from the observation side, and the direction from the near side of the paper surface toward the far side in FIG. 6 corresponds to the positive direction of the Z axis shown in FIG. 2 and FIG. 3. Consequently, in FIG. 6, the element substrate 10 is located on the nearest side relative to the paper surface, and the other elements are located on the far side of the paper surface relative to the element substrate 10. In the drawing, in order to prevent complication of the drawing, regarding each element constituting the aforementioned liquid crystal panel 1, elements, such as the pixel electrodes 12 and the TFD elements 13, are omitted from the drawing.

As shown in the drawing, each data line 11 extends in the Y direction in the display region and, in addition, crosses over one edge (the lower side edge in FIG. 6) of the sealing material 30, and reaches the inside of the edge side region 10a. The end portion of each data line 11, which has reached the inside of the edge side region 10a, is connected to an output terminal of the X driver IC 41 through the anisotropic conductive film. Under such a configuration, the data signal generated by the X driver IC 41 is output to each data line 11.

Figure 7:
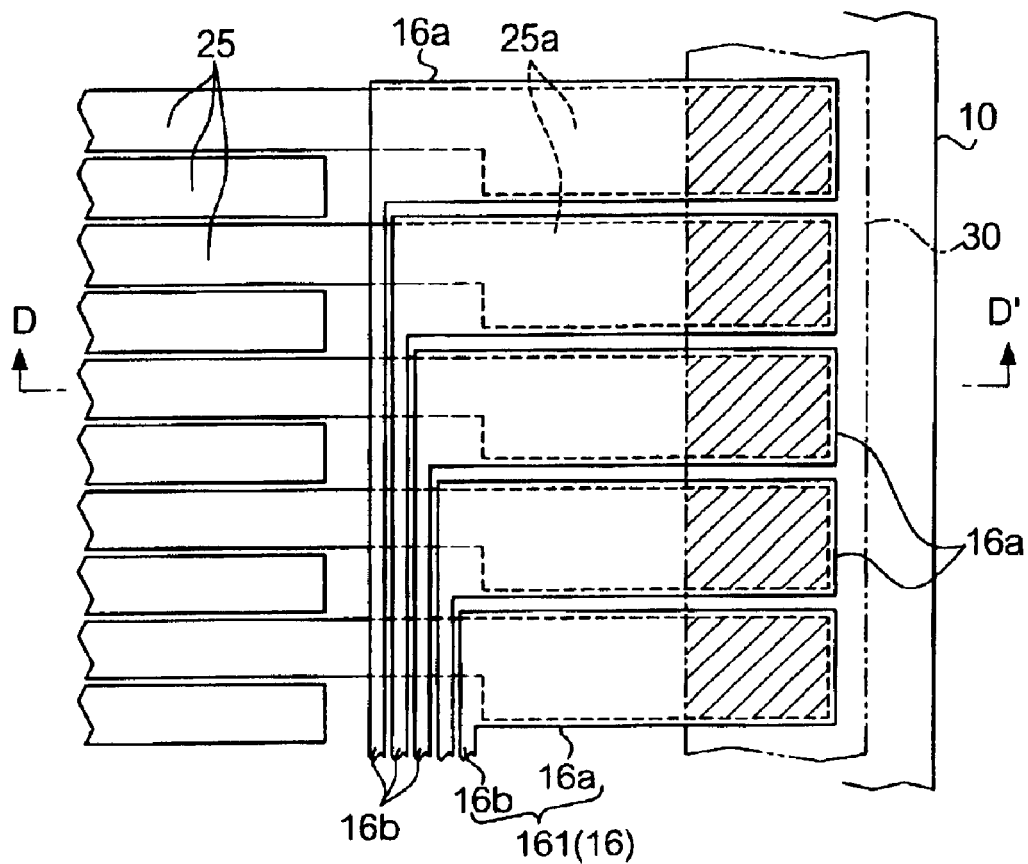
FIG. 7 is a plan view showing the neighborhood of the portion, at which the odd-numbered scanning lines and the routing wiring are brought into vertical conduction, under magnification.
Figure 8:
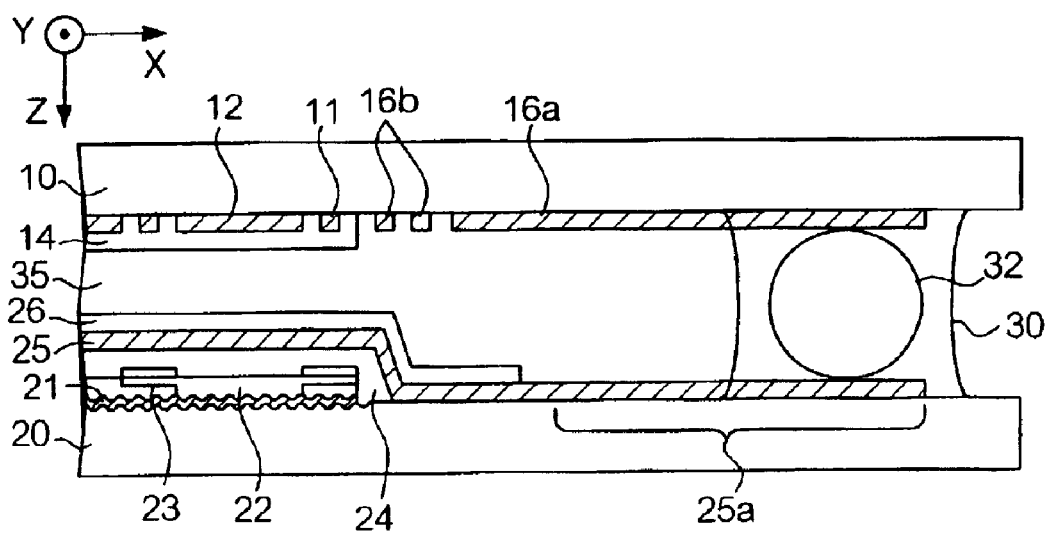
FIG. 8 is a sectional view when viewed from the line D–D' shown in FIG. 7.

On the other hand, the plurality of scanning lines 25 (diagonally shaded in FIG. 6) extending in the X direction on the counter substrate 20 are led out alternately to the A side and the B side on a line basis. That is, the odd-numbered scanning lines 25 are led out to the B side, and the even-numbered scanning lines 25 are led out to the A side. Herein, FIG. 7 is a plan view showing the neighborhood of the edge on the B side of the sealing material 30 under magnification, and FIG. 8 is a sectional view when viewed from the line D–D' shown in FIG. 7. As shown in FIG. 8, the color filter 22, the overcoat layer 24, etc., are not formed in the neighborhood of the region covered with the sealing material 30 on the counter substrate 20. On the other hand, the odd-numbered scanning lines 25 reach the surface of the counter substrate 20 from the surface of the overcoat layer 24 and, in addition, extend toward the edge on the B side of the sealing material 30 so that the end portions thereof overlap the sealing material 30. As shown in FIG. 7, the width of the neighborhood of the end portion covered with the sealing material 30 of the scanning line 25 (hereafter denoted as "conduction portion 25*a*" is made larger than the width of the portion located in the display region. Likewise, the even-numbered scanning line 25 also extends toward the edge on the A side of the sealing material 30, and the conduction portion 25*a* located at the end portion thereof overlaps the edge on the A side of the sealing material 30, as shown in FIG. 6.

However, since the sealing material 30 terminates at the liquid crystal injection hole 30*a*, the even-numbered scanning line 25 which has reached this liquid crystal injection hole 30*a* (the fourth scanning line 25 from top in FIG. 6), the end portion thereof is not covered with the sealing material 30.

On the other hand, as shown in FIG. 6, on the surface facing the counter substrate 20 of the element substrate 10, a plurality of routing wiring 16 are formed along the two edge sides extending in the Y direction on the element substrate 10. Each routing wiring 16 is a wiring for connecting the output terminal of the Y driver IC 40 and the scanning line 25, and is formed from the same layer as at least one of the pixel electrodes 12 formed on the element substrate 10 and the first metal film 13*a* (data line 11) or the second metal film 13*b* constituting the TFD element 13. As shown in FIG. 6, the routing wiring 16 is composed of a routing wiring 161 formed along the edge side on the B side of the element substrate 10 and a routing wiring 162 formed along the edge side on the A side of the element substrate. These routing wiring 16 individually include the conduction portions 16*a* and extension portions 16*b* extending along the edge side of the element substrate 10.

The conduction portion 16*a* of each routing wiring 16 is formed in order to face the conduction portion 25*a* of the scanning line 25. That is, as shown in FIG. 7 and FIG. 8, the conduction portion 25*a* of the odd-numbered scanning line 25 formed on the counter substrate 20 vertically conducts to the conduction portion 16*a* of the routing wiring 161 formed on the element substrate 10 through the conducting particle 32 located at the edge on the B side of the sealing material 30 among those dispersed in the sealing material 30. In FIG. 7, the portions, at which the scanning lines 25 and the routing wiring 161 are brought into vertical conduction through the sealing material 30, are diagonally shaded. Likewise, the even-numbered scanning lines 25 conduct to the conduction portions 16*a* of the routing wiring 162 formed on the element substrate 10 through the conducting particles 32 located at the edge on the A side of the sealing material 30 except the scanning line 25, the end portion of which has reached the liquid crystal injection hole 30*a*.

As shown in FIG. 6, the extension portion 16*b* of each routing wiring 161 extends in the Y direction in the region surrounded by the inner perimeter edge of the sealing material 30 while one end thereof is joined to the conduction portion 16*a* in that region. The extension portion 16*b* crosses over one edge of the sealing material 30, reaches the edge side region 10*a* (for more details, the portion on the B side in the edge side region), and the end portion thereof is connected to the output terminal of the first Y driver IC 401. Likewise, regarding the extension portion 16*b* of the routing wiring 162, the end portion, which has reached the portion on the A side of the edge side region 10*a*, is connected to the output terminal of the second Y driver IC 402.

Figure 9:
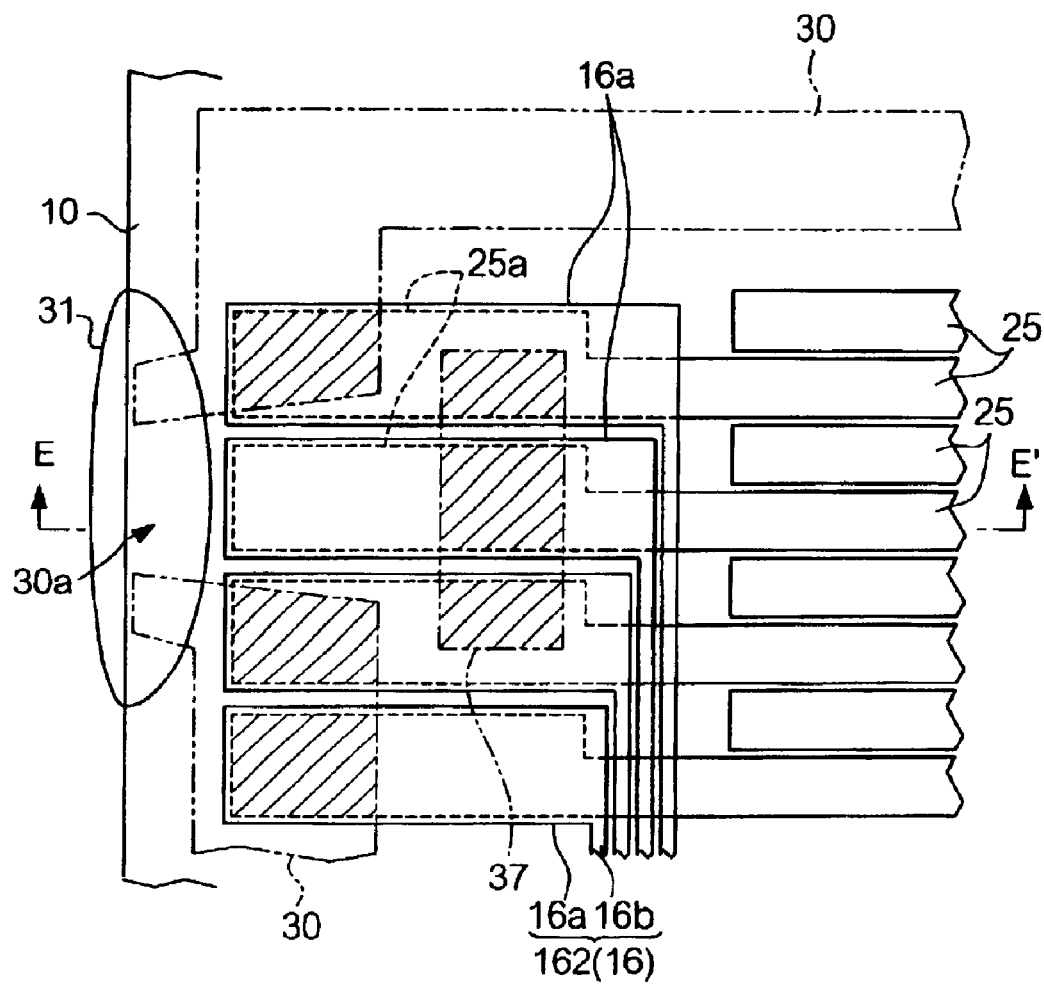
FIG. 9 is a plan view showing the neighborhood of the liquid crystal injection hole of the portion, at which the even-numbered scanning lines and the routing wiring are brought into vertical conduction, of the liquid crystal panel, under magnification.
Figure 10:
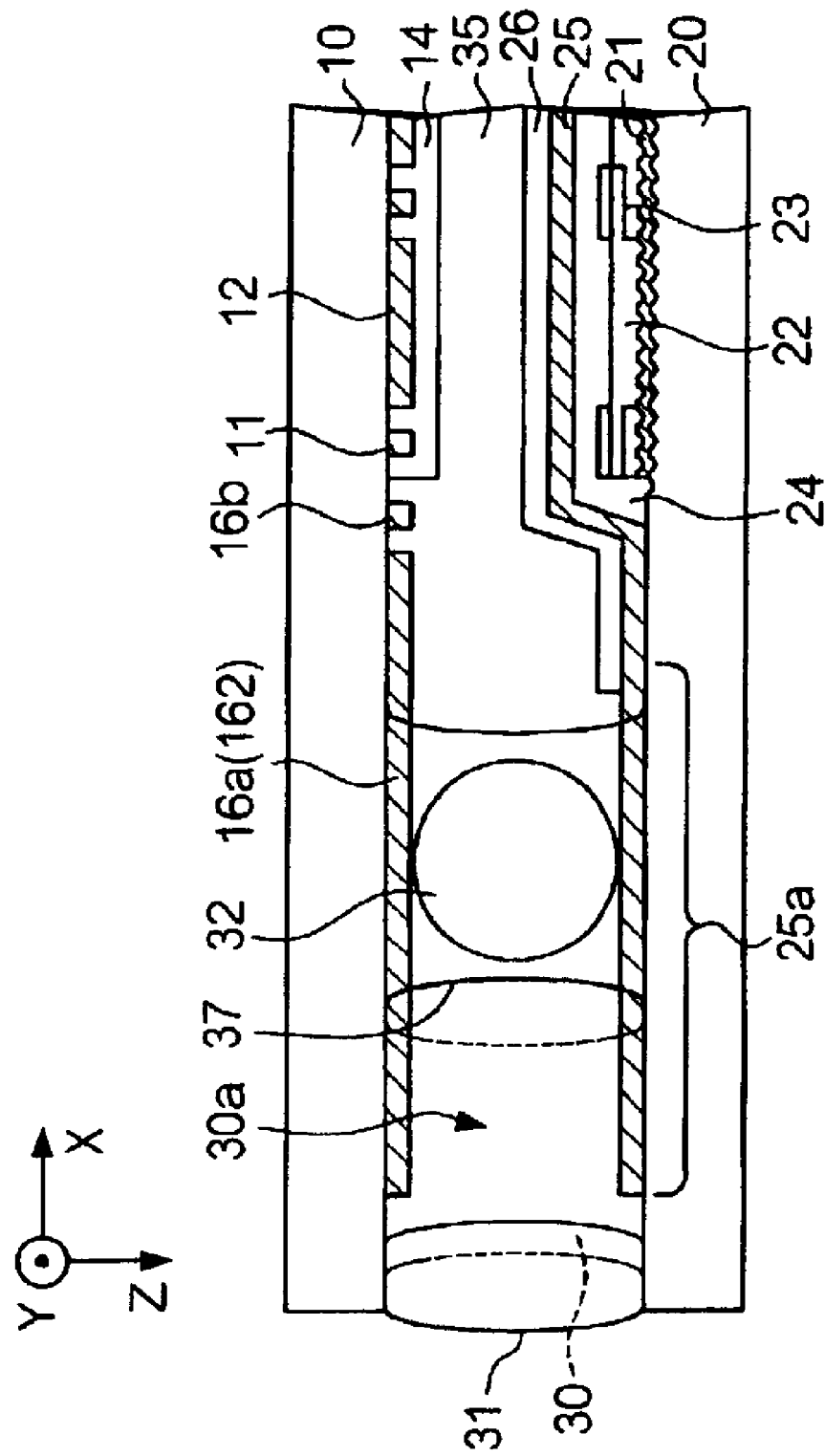
FIG. 10 is a sectional view when viewed from the line E–E' shown in FIG. 9.

Herein, as described above, since the sealing material 30 is not interposed between the scanning line 25, which has reached the liquid crystal injection hole 30*a*, and the conduction portion 16*a* of the routing wiring 162 facing this, these are not brought into vertical conduction by the conducting particle 32 in the sealing material 30.

a. Consequently, in the present embodiment, as shown in FIG. 6, vertical conduction between the scanning line 25, which has reached the liquid crystal injection hole 30*a*, and the conduction portion 16*a* facing this is achieved by installing a vertical conduction portion 37 independent of the sealing material 30. Herein, FIG. 9 is a plan view showing the configuration of the neighborhood of the vertical conduction portion 37, and FIG. 10 is a sectional view when viewed from the line E–E' shown in FIG. 9. As shown in these drawings, the vertical conduction portion 37 is formed in the neighborhood of the liquid crystal injection hole 30*a* in the region surrounded by the sealing material 30 in order to interpose between the conduction portion 25*a* of the scanning line 25 toward the liquid crystal injection hole 30*a* and the conduction portion 16*a* of the routing wiring 162. In other words, the vertical conduction portion 37 is offset from the liquid crystal injection hole 30 in the interior of the sealing material 30.

As shown in FIG. 10, conducting particles 32 are also dispersed in the vertical conduction portion 37 in a manner similar to that in the sealing material 30. Consequently, the conduction portion 25*a* of the scanning line 25 and the conduction portion 16*a* of the routing wiring 162 facing each other with the vertical conduction portion 37 therebetween are brought into vertical conduction through the conducting particle 32. In FIG. 9, the portions at which the scanning lines 25 and the routing wiring 162 are brought into vertical conduction through the sealing material 30 or the vertical conduction portion 37 are diagonally shaded. As described later, the vertical conduction portion 37 in the present embodiment is formed in the printing step of the sealing material 30 from the same material as the sealing material 30. As described above, simplification of the manufacturing step and reduction of manufacturing costs can be achieved by forming both the sealing material 30 and the vertical conduction portion 37 in a single step.

Furthermore, as shown in FIG. 9, the vertical conduction portion 37 is formed such that its major axis (i.e., its largest length) extends in a direction parallel to the edge of the sealing material 30 where the liquid crystal injection hole 30*a* has been formed (the Y direction). The vertical conduction portion 37 is formed in order to partially overlap not only the one scanning line 25 which does not include a portion facing the sealing material 30 (that is, the scanning line 25 having an end portion which reaches the liquid crystal injection hole 30*a*) and the routing wiring 162, but also the scanning lines 25 and the routing wiring 162 adjacent thereto. Therefore, as is also clear from the diagonally shaped portion shown in FIG. 9, these scanning lines 25 and the routing wiring 162 corresponding thereto are brought into vertical conduction by both the sealing material 30 and the vertical conduction portion 37.

According to such a configuration, all scanning lines 25 including the scanning line 25 leading out toward the liquid crystal injection hole 30*a* conduct individually to the conduction portions 16*a* of the routing wiring 16. Consequently, the scanning signal output from the first driver IC 401 is supplied to the odd-numbered scanning line 25 formed on the counter substrate 20 through the extension portion 16*b* and the conduction portion 16*a* of the routing wiring 161 and the conducting particle 32 dispersed in the edge on the B side of the sealing material 30. On the other hand, the scanning signal output from the second driver IC 402 is supplied to the even-numbered scanning line 25 through the extension portion 16*b* and the conduction portion 16*a* of the routing wiring 162 and the conducting particle 32 dispersed in the edge on the A side of the sealing material 30 or the vertical conduction portion 37.

As described above, in the present embodiment, the scanning lines 25 on the counter substrate 20 are brought into vertical conduction to the routing wiring 16 on the element substrate 10 through the conducting particles 32 dispersed in the vertical conduction portion 37 in addition to the conducting particles 32 dispersed in the sealing material 30. According to this, even when the liquid crystal injection hole 30*a* is formed in the edge used for vertical conduction of the sealing material 30, the scanning lines 25 and the routing wiring 16 can be brought into vertical conduction with reliability.

Since the scanning lines 25 formed on the counter substrate 20 are brought into vertical conduction to the routing wiring 16 formed on the element substrate 10, the configuration, in which the wiring for applying voltage to the liquid crystal are concentrated on only the element substrate 10, can be adopted. Consequently, according to the present embodiment, simplification of the configuration of liquid crystal panel and narrowing of the picture frame region can be achieved. That is, for example, as shown in FIG. 2 and FIG. 3, the configuration, in which both the X driver IC 41 for supplying the data signal to the data line 11 and the Y driver IC 40 for supplying the scanning signal to the scanning line 25 are mounted on the element substrate 10, can be adopted.

B: Manufacturing Process

Next, a manufacturing method for the liquid crystal panel 1 according to the present embodiment will be described. Herein, the case where four element substrates 10 are multiply produced from one sheet of a first original base material (so-called mother glass) while four counter substrates 20 are multiply produced from one sheet of a second original base material is assumed. That is, the case where the first original base material and the second original base material adhered facing each other are partitioned into four parts and, thereby, four liquid crystal panels are produced is assumed. In FIG. 11 to FIG. 14 shown below, it should be noted that, in a manner similar to that in the aforementioned FIG. 6, the element substrate 10 (more precisely, the first original base material including the region to become the element substrate 10) is shown in the drawing in order to be located on the nearest side relative to the paper surface and, therefore, the other elements are located on the far side of the paper surface relative to the element substrate 10.

Figure 11:
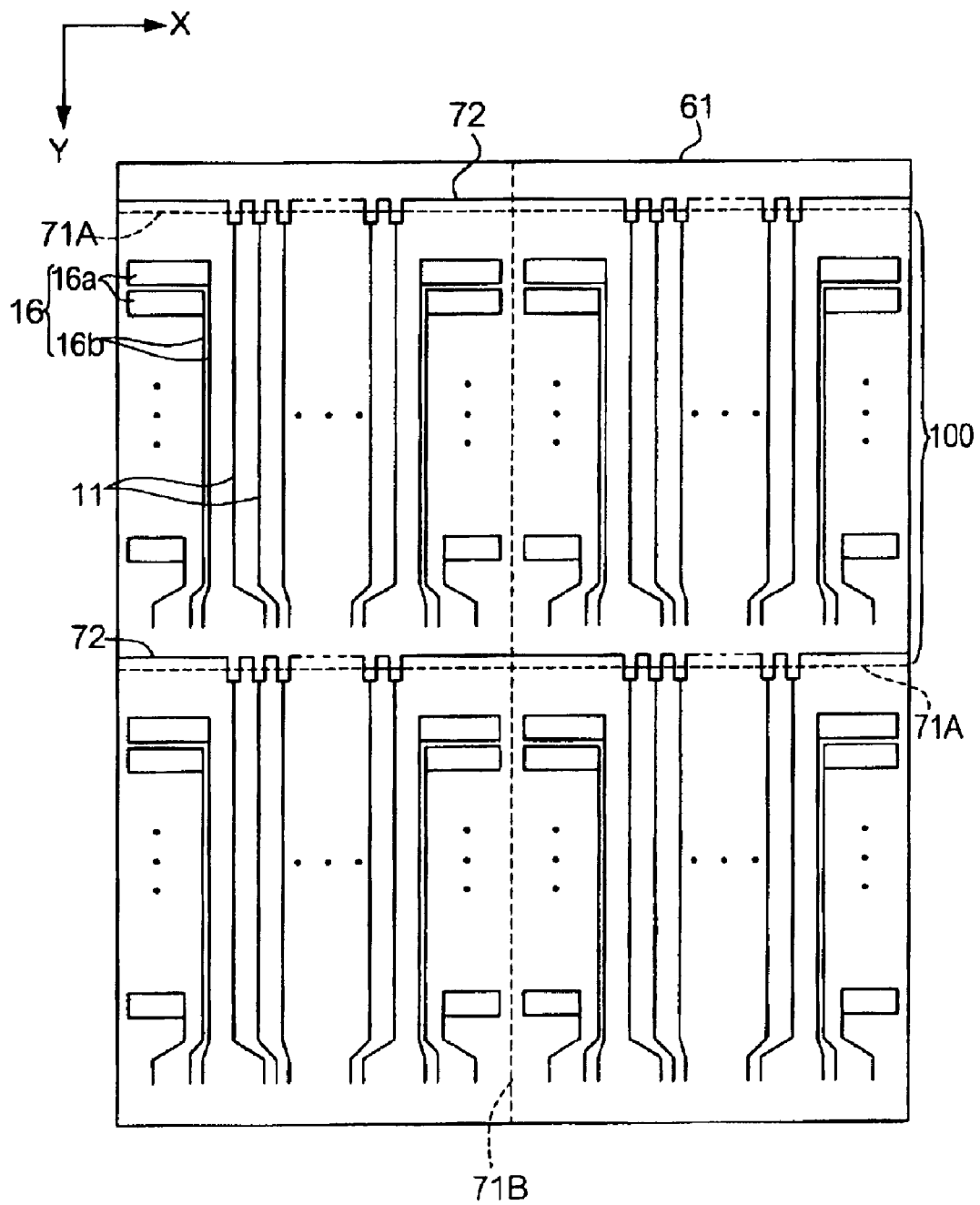
FIG. 11 is a plan view showing constituents formed on a first original base material in a manufacturing process of the liquid crystal panel.

A first original base material 61 including regions (hereafter denoted as "element substrate region") 100 corresponding to the plurality of element substrates 10 is prepared (refer to FIG. 11). However, the first original base material 61 in the present embodiment includes four element substrate regions 100 in total composed of two longitudinal by two transverse, as shown in FIG. 1. That is, the element substrate 10 constituting one liquid crystal panel 1 corresponds to the one made by partitioning the first original base material 61 along the partition line 71A extending in the X direction shown in the drawing and the partition line 71B extending in the Y direction.

Figure 15:
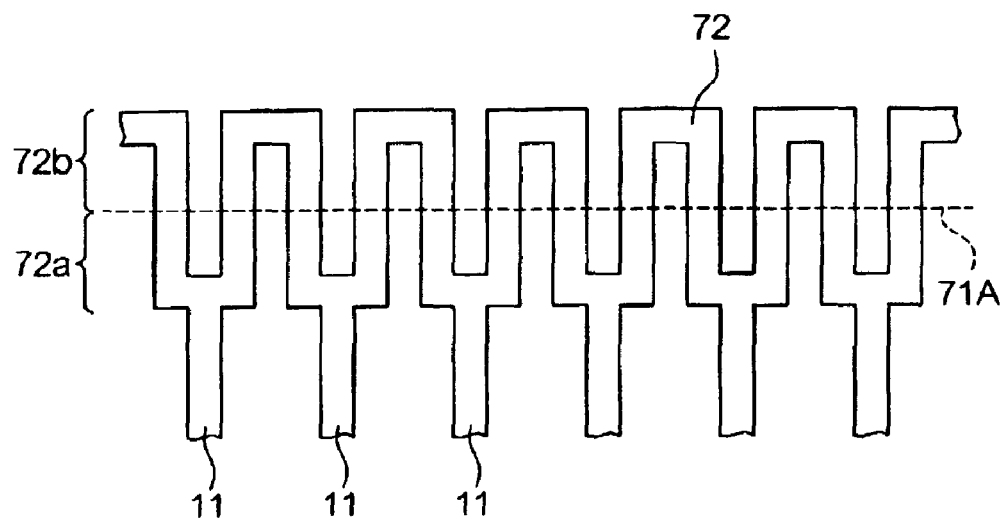
FIG. 15 is a plan view showing a manner of a common wiring before partition into individual liquid crystal cells is performed in the manufacturing process of the liquid crystal panel.
Figure 16:
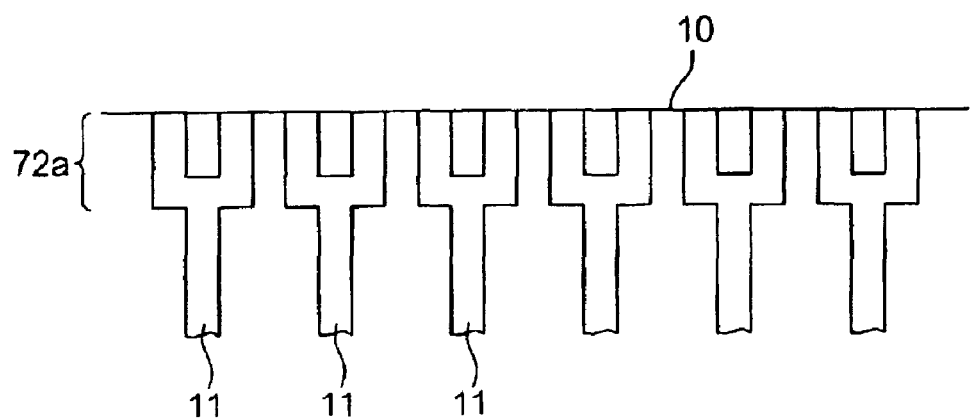
FIG. 16 is a plan view showing a manner of common wiring after partitioning into individual liquid crystal cells is performed in the manufacturing process of the liquid crystal panel.

As shown in FIG. 11, data lines 11, pixel electrodes 12, TFD elements 13, and routing wiring 16 are formed in every element substrate region 100 included in the first original base material 61. More specifically, after a conductive film made of, for example, tantalum (Ta), is formed over the surface of the first original base material 61, this conductive film is patterned by the use of a photolithography technique or an etching technique and, therefore, data lines 11, the first metal films 13*a* which are portions branched from the data lines 11, and the routing wiring 16 are formed. Furthermore, a common wiring 72, to which one end of each data line 11 is joined, is formed before this patterning. Herein, FIG. 15 is a plan view showing this common wiring 72 under magnification. As shown in FIG. 15 and FIG. 11, the common wiring 72 includes a plurality of portions 72*a* connected to the data lines 11 in the element substrate region 100 and portions 72*b* connecting the portions 72*a* with each other in the region on the side opposite to the element substrate region 100 side with respect to the partition line 71A. Consequently, all data lines 11 formed in one element substrate region 100 conduct through the common wiring 72. As a result, these data lines 11 are kept at the same electric potential in the condition before the first original base material 61 is partitioned along the partition line 71A. On the other hand, in the condition after the first original base material 61 is partitioned along the partition line 71A in a later step, as shown in FIG. 16, since the adjacent portions 72*a* in the common wiring 72 are isolated from each other, individual data lines 11 are electrically partitioned. In the aforementioned FIG. 6, illustration of this common wiring 72 is omitted.

The surfaces of the aforementioned data lines 11 and the first metal films 13*a* branched from the data lines 11 are oxidized by an anodic oxidation method and, therefore, the oxide films 13*b* made of tantalum oxide are formed on the surfaces thereof. Specifically, after the first original base material 61 is immersed in a predetermined electrolytic solution, a predetermined voltage is applied between the electrolytic solution and the common wiring 72 and, therefore, the surfaces of the data lines 11 and the first metal films 13*a* are oxidized. The routing wiring 16 are not subjected to anodic oxidation.

Subsequently, after a metal film made of chromium, etc., is deposited on the first original base material 61, this is patterned and, therefore, second metal films 13*c* of the TFD elements are formed.

a. As a result, the TFD elements 13 shown in the aforementioned FIG. 5 are formed. As described above, since all data lines 11 in the element substrate region 100 are kept at the same electric potential, it is avoided that the TFD elements 13 are broken by static electricity in later steps. In the patterning of the aforementioned chromium layer, a chromium layer is also laminated on the surfaces of the routing wiring 16.

After a transparent conductive film made of ITO, etc., is deposited on the first original base material 61, this is patterned and, therefore, the pixel electrodes 12 arranged in the shape of a matrix are formed. Thereafter, an orientation film 14 is formed in each element substrate region 100 of the first original base material 61, and is subjected to a rubbing treatment.

Figure 12:
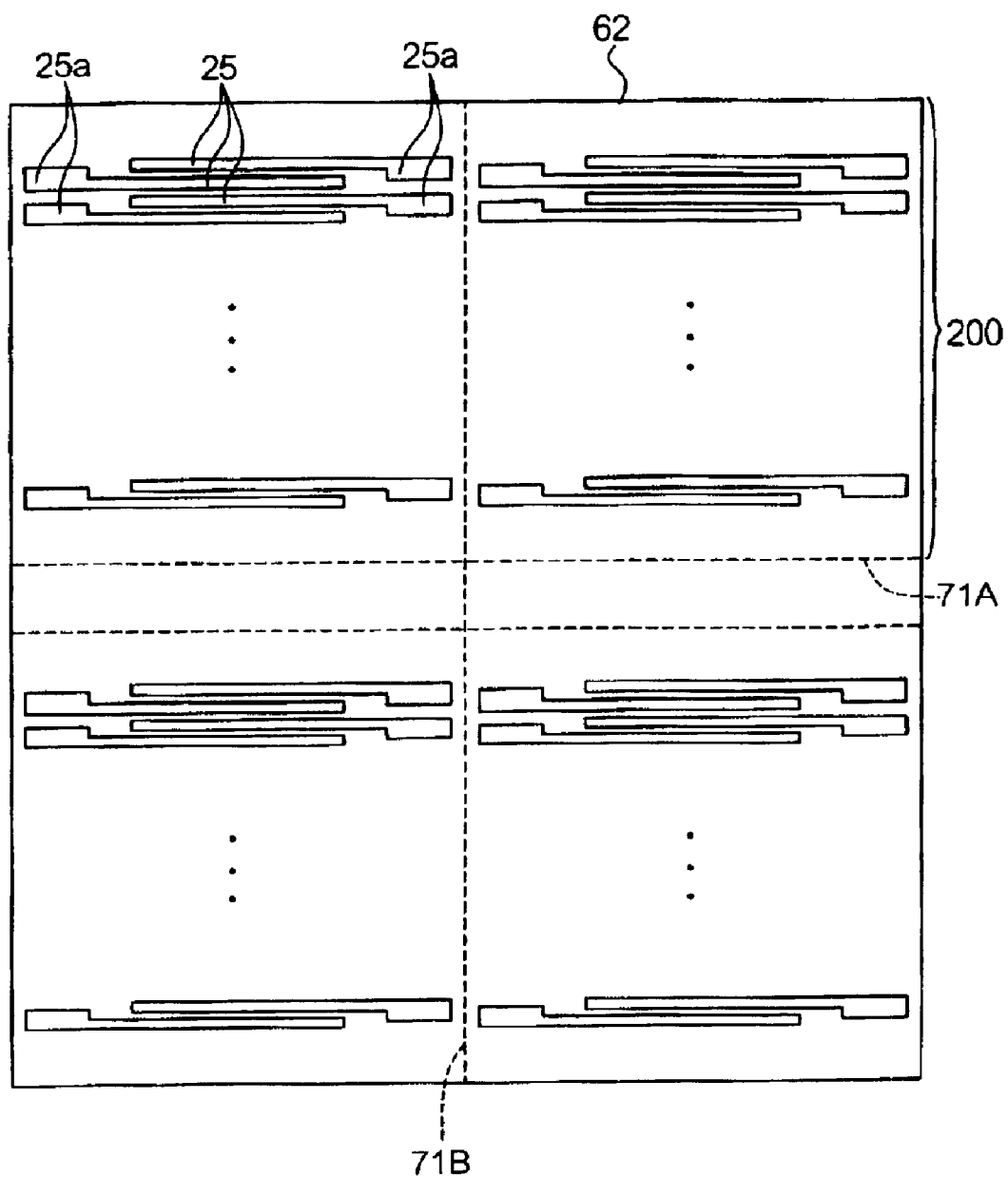
FIG. 12 is a plan view showing constituents formed on a second original base material in a manufacturing process of the liquid crystal panel.

On the other hand, regarding the second original base material 62 (refer to FIG. 12) for the counter substrate 20, a reflection layer 21, a color filter 22, a lightproof layer 23, and an overcoat layer 24 are formed in every region (hereafter denoted as "counter substrate region") 200 corresponding to each of four counter substrates 20. Since these elements can be produced using various publicly known methods, the explanations thereof are omitted. As shown in FIG. 12, after a transparent conductive film of ITO, etc., is formed on the surface of the overcoat layer 24 formed in each counter substrate region 200, this is patterned and, therefore, a plurality of scanning lines 25 are formed. As described above, regarding this scanning line 25, the width of the conduction portion 25a to face the sealing material 30 or the vertical conduction portion 37 is made larger than the width of the other portions. An orientation film 26 is further formed in each counter substrate region 200, and is subjected to a rubbing treatment.

Each element substrate region 100 of the first original base material 61 produced by the aforementioned step is concurrently coated with the sealing material 30 having the liquid crystal injection hole 30a and the vertical conduction portion 37 located in the neighborhood of the liquid crystal injection hole 30a and in a region substantially surrounded by the sealing material 30 by using, for example, screen printing. The conducting particles 32 are dispersed in both the sealing material 30 and the vertical conduction portion 37 formed at this time. The liquid crystal injection hole 30a is formed in the edge used for vertical conduction between the scanning lines 25 and the routing wiring 16.

Figure 13:
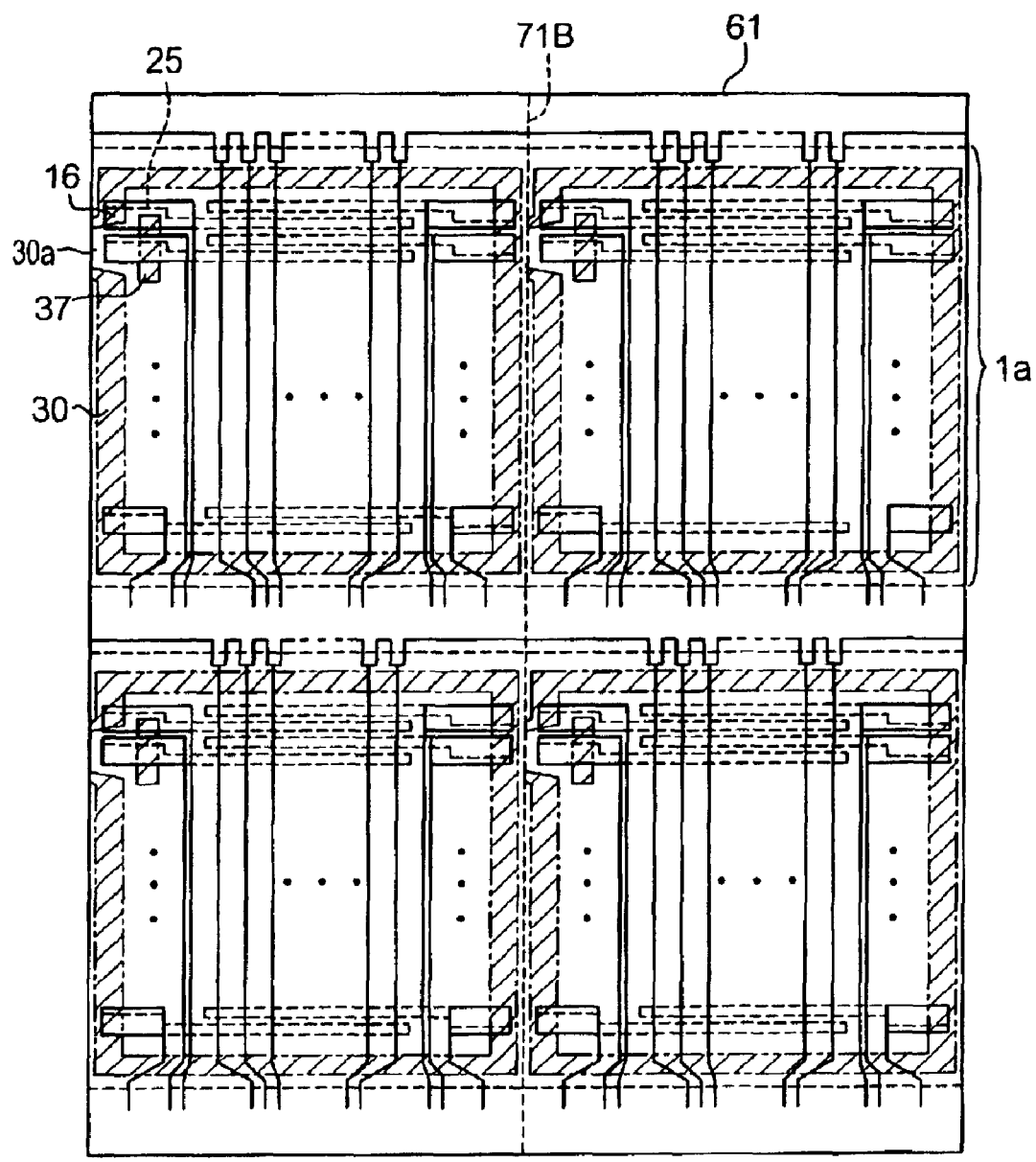
FIG. 13 is a plan view showing the condition in which the first original base material and the second original base material are adhered with the sealing material therebetween in the manufacturing process of the liquid crystal panel.

Subsequently, as shown in FIG. 13, the first original base material 61 and the second original base material 62 are adhered with the sealing material 30 and the vertical conduction portion 37 (both are diagonally shaded in FIG. 13) therebetween under the condition that each element substrate region 100 and each counter substrate region 200 are facing each other. As a result, the scanning line 25, which reaches the liquid crystal injection hole 30a, among the scanning lines 25 formed in each counter substrate region 200 and the routing wiring 16 formed in each element substrate region 100 are brought into conduction through the conducting particle 32 in the vertical conduction portion 37 and, in addition, the other scanning lines 25 and the routing wiring 16 are brought into conduction through the conducting particles 32 in the sealing material 30. According to the aforementioned steps, the four liquid crystal cells 1a in total composed of two longitudinal cells by two transverse cells become joined to each other. As shown in FIG. 13, the liquid crystal injection hole 30a of each liquid crystal cell 1a faces in the same direction (A side) in the substrate surface of the original base material regarding all liquid crystal cells 1a.

These four liquid crystal cells 1a are partitioned along the partition line 71B between the two liquid crystal cells 1a aligned in a row in the extension direction of the data lines 11 (the X direction). As a result, a liquid crystal cell group 1b (refer to FIG. 14) composed of two liquid crystal cells Ia aligned in a row in the extension direction of the data lines 11 is produced. Since the portion 72a and the portion 72b of the common wiring 72 are not separated even after this partition, electrical potentials of all data lines 11 formed in the element substrate region 100 become the same.

Figure 14:
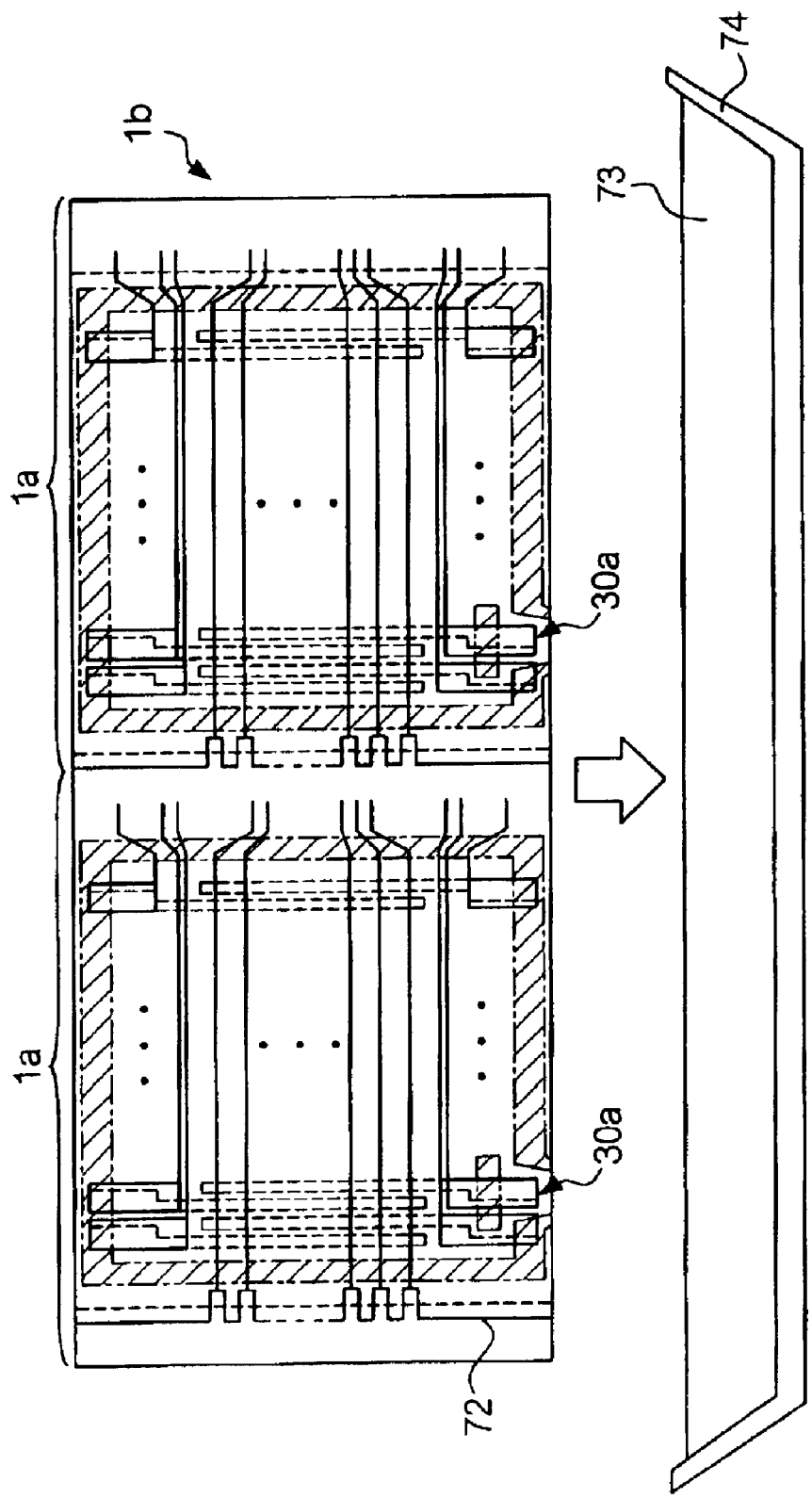
FIG. 14 is a diagram showing a manner of the step of injecting a liquid crystal in the manufacturing process of the liquid crystal panel.

A liquid crystal is injected into the two liquid crystal cells 1a constituting this liquid crystal cell group 1b by one operation. That is, as shown in FIG. 14, a container 74 filled with the liquid crystal 73 and the liquid crystal cell group 1b are placed in a chamber of a liquid crystal injection apparatus and, thereafter, the inside of the chamber is evacuated to form a vacuum. The liquid crystal injection hole 30a of each liquid crystal cell 1a constituting the liquid crystal cell group 1b is immersed in the liquid crystal 73 in the aforementioned container 74. Herein, since in the step of forming the aforementioned sealing material 30, the liquid crystal injection holes 30a are formed in order to face in the same direction in each liquid crystal cells 1a, as shown in FIG. 14, the liquid crystal injection holes 30a of the two liquid crystal cells 1a constituting the liquid crystal cell group 1b are aligned along one edge of the liquid crystal cell group 1b. Consequently, the liquid crystal injection holes 30a of all liquid crystal cells 1a are immersed in the liquid crystal 73 by immersing this edge in the liquid crystal. When the inside of the chamber is returned to atmospheric pressure, a pressure difference occurs between the inside of each liquid crystal cell 1a and the inside of the chamber and, thereby, the liquid crystal is injected into all liquid crystal cells 1a by one operation. After the liquid crystal is thus injected in each liquid crystal cell, the liquid crystal injection holes 30a are blocked by the sealing agent 31. Since data lines 11 of each liquid crystal cell 1a are electrically connected through the common wiring 72 even during the liquid crystal injection step, electrostatic discharge damage to the TFD element 13 is avoided.

The liquid crystal cell group 1b is partitioned into individual liquid crystal cells 1a along the partition line 71A. At the same time with this partition, the common wiring 72 formed across the partition line 71A is divided into individual portions 72a connected to respective data lines 11, as shown in FIG. 16. That is, accompanying the partition of the liquid crystal cell group 1b, the plurality of data lines 11 formed on the element substrate 10 are electrically divided into individuals. Subsequently, mounting of the Y driver IC 40 and the X driver IC 41, etc., are performed in every liquid crystal cells 1a in which the liquid crystal 35 is encapsulated and, therefore, the liquid crystal panel 1 shown in the aforementioned FIG. 2 and FIG. 3 can be produced.

As described above, from the viewpoint of applying voltage to all data lines 11 by one operation when the oxide films 13b of the TFD elements 13 are formed and of preventing electrostatic discharge damage to the TFD elements, it is desirable to adopt a method in which the common wiring 72 for electrically connecting the plurality of data lines 11 is formed and, in addition, each data line 11 is electrically partitioned at the same time with the partition of the liquid crystal cell group 1b. When this method is adopted, the plurality of liquid crystal cells 1a should be joined in the extension direction of the data lines 11 until the liquid crystal is injected into the liquid crystal cells 1a constituting the liquid crystal cell group 1b and partition is performed. Consequently, the liquid crystal injection hole 30a should not be installed in the direction of joining of the plurality of liquid crystal cells 1a in the sealing material 30 of each liquid crystal cell 1a. On the other hand, when the liquid crystal injection hole 30a is installed at the edge to be used for vertical conduction in the sealing material 30, it may occur that vertical conduction between the scanning line 25, which reaches the neighborhood of the liquid crystal injection hole 30a and which does not overlap the sealing material 30, and the routing wiring 16 is not achieved. In contrast to this, in the present embodiment, since the scanning lines 25, which have reached the neighborhood of the liquid crystal injection hole 30*a*, are brought into vertical conduction to the routing wiring 16 through the vertical conduction portion 37, the liquid crystal injection hole 30*a* can be formed at a part of the edge used for vertical conduction in the sealing material 30. Furthermore, directions of the liquid crystal injection holes 30*a* can be made uniform in each of the plurality of liquid crystal cells 1*a* constituting the liquid crystal cell group 1*b*, the liquid crystal can be injected into all these liquid crystal cells 1*a* by one operation. That is, according to the present embodiment, even when the liquid crystal injection hole 30*a* is formed at the edge used for vertical conduction (that is, the edge in the same direction as the extension direction of the data lines 11) in the sealing material 30 in order to improve productivity of the liquid crystal panel, regarding all wiring including the wiring (the scanning lines 25) which have reached the neighborhood of the liquid crystal injection hole 30*a*, vertical conduction can be achieved with reliability.

In the liquid crystal injection step shown in FIG. 14, when the liquid crystal is rapidly injected into the liquid crystal cell 1*a*, it may occur that the orientation state of the orientation films 14 and 26 formed on both substrates is broken by the flow of the liquid crystal. In the present embodiment, since the vertical conduction portion 37 is formed inside the liquid crystal injection hole 30*a*, the flow of the liquid crystal injected into the liquid crystal cell 1*a* through the liquid crystal injection hole 30*a* is temporarily interrupted by the vertical conduction portion 37. That is, since the liquid crystal does not rapidly flow into the liquid crystal cell 1*a*, there is an advantage that breakage of the orientation state on the surface of the orientation films 14 and 26 can be avoided.

C: Modified Example

One embodiment according to the present invention was described above. However, the aforementioned embodiment is no more than an exemplification, and various modifications can be applied to the aforementioned embodiment within the scope of the present invention. It is considered that modified examples include, for example, the following.

C-1: Modified Example 1

In the aforementioned embodiment, the scanning line 25, which reached the neighborhood of the liquid crystal injection hole 30*a* and which did not overlap the sealing material 30 was assumed to be one line. However, it is needless to say that the number of lines may be equivalent to or more than this. That is, when a plurality of scanning lines 25 reach the neighborhood of the liquid crystal injection hole 30*a* and do not overlap the sealing material 30, it is essential only that the vertical conduction portion 37 is installed in order to overlap all of these scanning lines 25.

In the aforementioned embodiment, the vertical conduction portion 37 was installed in order to face not only the scanning line 25, which reached the liquid crystal injection hole 30*a* and which did not have a portion facing the sealing material 30, but also the scanning lines 25 adjacent thereto, that is, the scanning lines 25 having a portion facing the sealing material 30. However, the scanning lines 25 having a portion facing the sealing material 30 do not necessarily face the vertical conduction portion 37 because vertical conduction to the routing wiring 16 is achieved by the conducting particles 32 in the sealing material 30.

That is, regarding the configuration, as long as at least one scanning line 25, which does not face the sealing material 30, among the plurality of scanning lines 25 vertically conducts to the routing wiring 16 through the vertical conduction portion 37, the effects shown in the aforementioned embodiment are achieved. However, among the scanning lines 25, regarding the scanning lines 25, which have a portion facing the routing wiring 16 with the sealing material 30 therebetween but in which the end portion thereof has reached the neighborhood of the liquid crystal injection hole 30*a*, it is also considered that the area to face the sealing material 30 may not be ensured adequately. For example, the area where the sixth scanning line 25 from top in FIG. 9 and the third routing wiring 162 from top in the same drawing face with the sealing material 30 therebetween (that is, the area used for vertical conduction) is smaller than the area where the eighth scanning line 25 from top and the fourth routing wiring 162 from top face with the sealing material 30 therebetween. Furthermore, when the sealing material 30 is formed using a printing technique as shown in the aforementioned embodiment, since the deviation of the position of formation is relatively large, variations are likely to occur in areas where the scanning lines 25, which have reached the neighborhood of the liquid crystal injection hole 30*a*, face the routing wiring 16 with the sealing material 30 therebetween. In consideration of these circumstances, it can be said that desirably, not only the scanning lines 25 which do not have a portion facing the sealing material 30, but also the scanning lines 25 which have a portion facing the sealing material 30 and which have reached the neighborhood of the liquid crystal injection hole 30*a* are brought into vertical conduction to the routing wiring 16 with the vertical conduction portion 37 therebetween.

In the aforementioned embodiment, the shape of the vertical conduction portion 37 was specified to include a major axis extending in the direction parallel to the edge, at which the liquid crystal injection hole 30*a* of the sealing material 30 was formed. However, the shape of the vertical conduction portion 37 is not limited to this. Furthermore, in the aforementioned embodiment, although the vertical conduction portion 37 was installed at a distance from the sealing material 30, it may take the shape connected to the sealing material 30.

C-2: Modified Example 2

Figure 17:
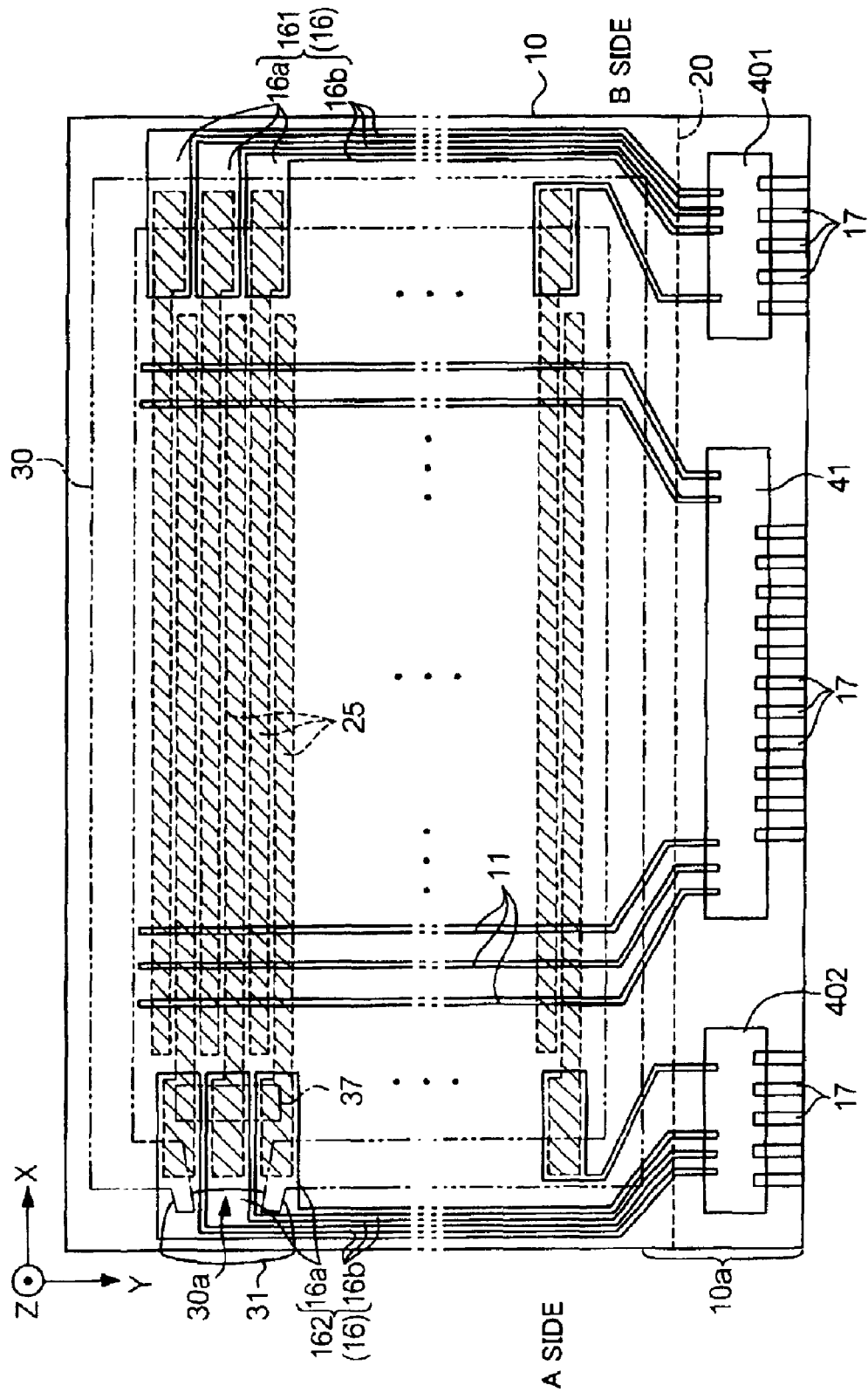
FIG. 17 is a plan view showing the mode of wiring in the liquid crystal panel according to a modified example of the present invention.

Regarding the aforementioned embodiment, in the configuration, the extension portions 16*b* of the routing wiring 16 were extended toward the edge side region 10*a* in the region surrounded by the sealing material 30. However, in the configuration, as shown in FIG. 17, the extension portions 16*b* may be extended toward the edge side region 10*a* outside the region surrounded by the sealing material 30. Also in this case, when the vertical conduction portion 37 is installed inside the liquid crystal injection hole 30*a* and, in addition, the scanning lines 25, which reach the neighborhood of the liquid crystal injection hole 30*a* and which do not overlap the sealing material 30, and the routing wiring 16 facing thereto are brought into vertical conduction through the conducting particles 32 dispersed in the vertical conduction portion 37, effects similar to those in the aforementioned embodiment can be achieved.

C-3: Modified Example 3

In the manufacturing process shown in the aforementioned embodiment, the sealing material 30 was formed on the first original base material 61 corresponding to the plurality of element substrates 10, and this was adhered to the second original base material 62. On the contrary, the sealing material 30 may be formed on the second original base material 62, and this may be adhered to the first original base material 61. In the aforementioned embodiment, the sealing material 30 and the vertical conduction portion 37 were formed in a single step from the same material in order that simplification of the manufacturing step and reduction of manufacturing costs were achieved. However, the sealing material 30 and the vertical conduction portion 37 may be formed by separate steps. Furthermore, in the aforementioned embodiment, four liquid crystal cells 1a were joined and partitioned into liquid crystal cell groups 1b in which two liquid crystal cells 1a were joined, and this was partitioned into individual liquid crystal cells 1a. However, it is needless to say that the number of liquid crystal cells 1a produced at the same time is not limited to this.

C-4: Modified Example 4

Regarding the aforementioned embodiment, in the configuration, the scanning lines 25 formed on the counter substrate 20 and the routing wiring 16 formed on the element substrate 10 were brought into conduction through the conducting particles 32. However, the target wiring for vertical conduction are not limited to these. For example, the routing wiring may be formed on the counter substrate 20, and the data lines 11 on the element substrate 10 and the routing wiring on the counter substrate 20 may be brought into conduction through the conducting particles 32 in the sealing material 30. Regarding the aforementioned embodiment, in the configuration, the plurality of scanning lines 25 were led out toward alternately the respective edges on the A side and the B side of the sealing material 30 on a scanning line 25 basis. However, regarding the configuration, all the scanning lines 25 may be led out toward only one edge of the sealing material 30.

Furthermore, in the aforementioned embodiment, the liquid crystal panel of active matrix system using the TFD element, which was a two-terminal type switching element, was exemplified. However, the present invention can also be applied to the liquid crystal panel using a three-terminal type switching element typified by a TFT (Thin Film Transistor) and the liquid crystal panel of a passive matrix system having no switching element. In each aforementioned embodiment, the reflective liquid crystal panel which performed only reflective display was exemplified. However, the present invention can also be applied to the so-called semitransparent reflective liquid crystal panel capable of transmissive display in addition to reflective display (transflective display). That is, in this case, it is only essential that regarding the configuration, a reflection layer having an opening for passing through incident light from the back side (counter substrate 20 side) or semitransparent reflection layer (a so-called half mirror) which reflects part of the light having reached the surface and transmits another part of the light is installed instead of the reflection layer 21 in the aforementioned embodiment and, in addition, an illumination apparatus is installed on the back side of the liquid crystal panel. Likewise, the present invention can also be applied to a so-called transmissive liquid crystal panel having no reflection layer.

As described above, when the panel adopts a configuration in which the wiring formed on one substrate and wiring formed on the other substrate are brought into conduction through conducting particles dispersed in the sealing material, it can be applied to the present invention no matter what mode may be taken with respect to other constituents.

D: Electronic Equipment

Next, electronic equipment using the liquid crystal panel according to the present invention will be described.

D-1: Mobile Type Computer

Figure 18:
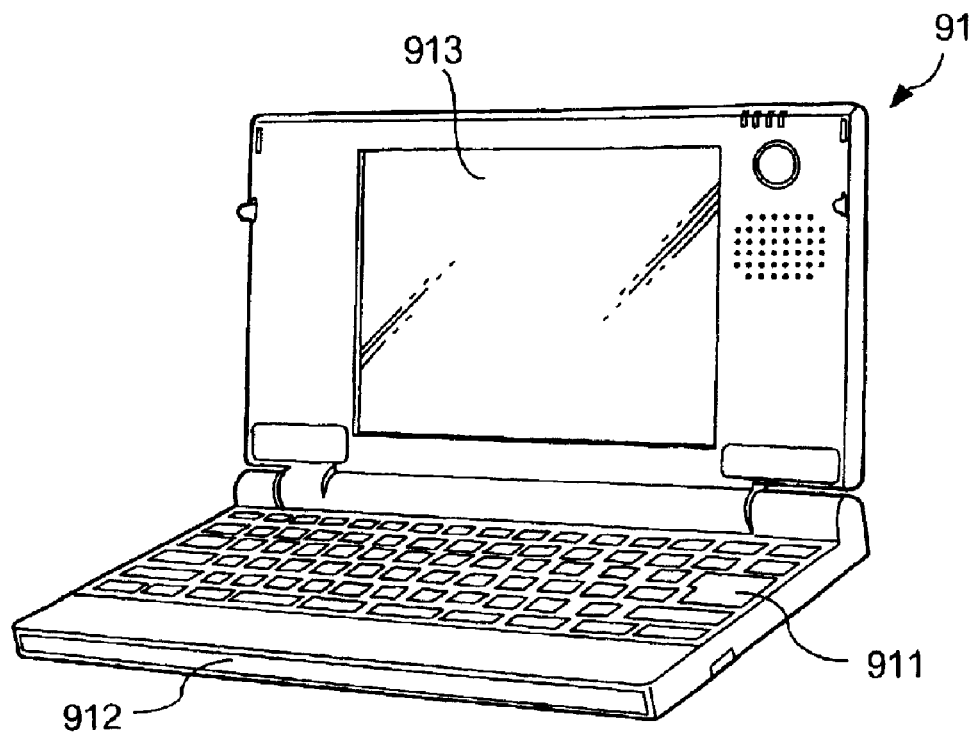
FIG. 18 is a perspective view of the configuration of a personal computer as an example of electronic equipment to which the liquid crystal panel according to the present invention is applied.

An example, in which the liquid crystal panel according to the present invention is applied to the display portion of a portable personal computer (so-called notebook personal computer), will be described. FIG. 18 is a perspective view showing the configuration of this personal computer. As shown in the aforementioned drawing, the personal computer 91 is provided with a body portion 912 including a keyboard 911, and a display portion 913, to which the liquid crystal panel according to the present invention is applied. In order to ensure visibility of the image even in a dark place, the liquid crystal panel of semitransparent type capable of not only reflective display, but also transmissive display is desirable as the liquid crystal panel used for such a personal computer.

D-2: Cellular Phone

Figure 19:
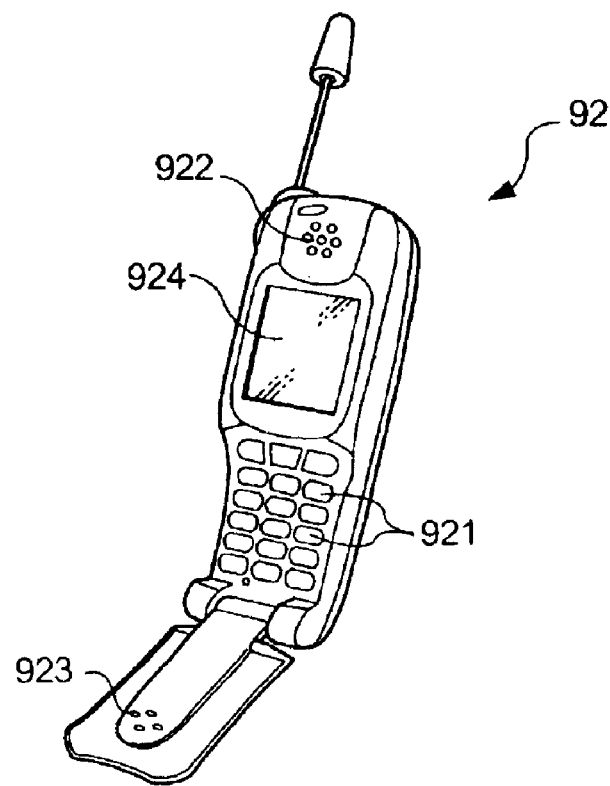
FIG. 19 is a perspective view of the configuration of a cellular phone as an example of electronic equipment to which the liquid crystal panel according to the present invention is applied.

An example, in which the liquid crystal panel according to the present invention is applied to the display portion of a cellular phone, will be described. FIG. 19 is a perspective view showing the configuration of this cellular phone. As shown in the aforementioned drawing, a cellular phone 92 is provided with a plurality of operation buttons 921 and, in addition, an earpiece 922, a mouthpiece 923, and furthermore a display portion 924, to which the liquid crystal panel according to the present invention is applied. Also in this case, it is desirable to use the liquid crystal panel of semitransparent type as the display portion in order to ensure visibility in a dark place.

Examples of electronic equipment, to which the liquid crystal panel according to the present invention can be applied, include, for example, liquid crystal televisions, viewfinder type monitor-direct-view type videotape recorders, car navigation devices, pagers, electronic notepads, desk-top calculators, word processors, work stations, videophones, POS terminals, digital steel cameras, or projectors using the liquid crystal panel according to the present invention as a light valve in addition to the personal computer shown in FIG. 18 and the cellular phone shown in FIG. 19. As described above, since vertical conduction can be achieved with reliability regardless of the position of the liquid crystal injection hole by the liquid crystal panel according to the present invention, in the electronic equipment provided with this, various inconveniences due to poor vertical conduction are prevented and, therefore, excellent display is realized.

As described above, according to the present invention, when the wirings formed on individual substrates are brought into vertical conduction to each other, restriction with respect to the position of the liquid crystal injection hole in the sealing material can be mitigated.

The entire disclosure of Japanese Application No. 2001-264731, filed Aug. 31, 2001 is incorporated by reference.

What is claimed is:

1. Liquid crystal panel including a liquid crystal between a first substrate having a plurality of first wirings and a second substrate having a plurality of second wirings, comprising:

a sealing material which is held between the first substrate and the second substrate, which has a liquid crystal injection hole for injecting the liquid crystal between both substrates, and in which conducting particles are dispersed at least in a portion of the sealing material where the plurality of first wirings and the plurality of second wirings face each other; and a vertical conduction portion which is installed proximate the liquid crystal injection hole and in a region substantially surrounded by the sealing material, the vertical conduction portion having conducting particles dispersed therein at least in a portion where the plurality of first wirings and the plurality of second wirings face each other, the vertical conduction portion being isolated from and not in contact with the sealing material.

2. The liquid crystal panel according to claim 1, wherein:
the plurality of first wirings extend in a direction from one edge having the liquid crystal injection hole formed in the sealing material toward another edge facing the one edge in a display region; and
among the plurality of first wirings, at least one first wiring, an end portion of which is located proximate the liquid crystal injection hole, includes a portion facing the second wiring with the vertical conduction portion therebetween.

3. The liquid crystal panel according to claim 1, wherein:
the vertical conduction portion is installed with a major axis thereof extending in a direction along an edge having the liquid crystal injection hole formed in the sealing material.

4. The liquid crystal panel according to claim 1, wherein:
the vertical conduction portion is spaced apart from the sealing material.

5. The liquid crystal panel according to claim 1, wherein:
the vertical conduction portion comprises the same material as that of the sealing material.

6. The liquid crystal panel according to claim 1, wherein:
portions of the plurality of first wirings and the plurality of second wirings facing at least one of the sealing material and the vertical conduction portion have widths larger than widths of remaining portions of the plurality of first wirings and the plurality of second wirings.

7. The liquid crystal panel according to claim 1, wherein:
the plurality of first wirings extend in a direction from one edge having the liquid crystal injection hole formed in the sealing material toward an other edge facing the one edge in a display region; and
the plurality of first wirings have portions facing alternately any one of the one edge of the sealing material and the vertical conduction portion and another edge of the sealing material on a wiring basis.

8. The liquid crystal panel according to claim 7, comprising:
a plurality of third wirings which are installed on the second substrate and which extend in a direction intersecting the first wirings;
a plurality of pixel electrodes facing the first wirings in the display region; and
a plurality of two-terminal type nonlinear elements connected to the third wirings and the pixel electrodes.

9. Electronic equipment comprising the liquid crystal panel according to claim 1.

10. Manufacturing method for a liquid crystal panel, in which a first substrate having a plurality of first wirings and a second substrate having a plurality of second wirings are adhered with a sealing material therebetween, a liquid crystal is injected between both substrates through a liquid crystal injection hole formed in the sealing material so as to manufacture the liquid crystal panel, comprising the steps of:
forming the sealing material containing conducting particles to be interposed in the portion where the plurality of first wirings and the plurality of second wirings are facing each other with the sealing material therebetween, on one of the first substrate and the second substrate;
forming a vertical conduction portion which is located proximate the liquid crystal injection hole in a region substantially surrounded by the sealing material, the vertical conduction portion being isolated from and not in contact with the sealing material, and in which conducting particles to be interposed in the portion where the plurality of first wirings and the plurality of second wirings are facing each other with the vertical conduction portion therebetween are dispersed; and
adhering the first substrate and the second substrate with the sealing material and the vertical conduction portion therebetween.

11. A liquid crystal panel comprising:
a first substrate having a plurality of first wirings formed thereon;
a second substrate having a plurality of second wirings formed thereon facing the first substrate;
a sealing material interposed between the first substrate and the second substrate and encapsulating a liquid crystal material therebetween; and
a vertical conductive portion interposed between the first substrate and the second substrate proximate a liquid crystal injection hole formed in the sealing materials the vertical conductive portion being isolated from and not in contact with the sealing material;
wherein the sealing material and vertical conductive portion include conductive particles dispersed therein conductively connecting the first plurality of wirings to the second plurality of wirings.

12. The liquid crystal panel of claim 11 wherein the vertical conductive portion conductively connects a pre-selected wiring of the first plurality of wirings to another pre-selected wiring of the plurality of second wirings, the pre-selected wiring being free of said sealing material.

13. The liquid crystal panel of claim 12 wherein an end of the pre-selected wiring of the plurality of first wirings extends adjacent said liquid crystal injection hole.

14. The liquid crystal panel of claim 11 wherein said sealing material extends substantially about a perimeter of said panel and said vertical conductive portion is spaced apart from said liquid injection hole toward an interior of the panel.

15. The liquid crystal panel of claim 14 wherein said vertical conductive portion is spaced apart from said sealing material.

16. The liquid crystal panel of claim 11 wherein said sealing material and said vertical conductive portion are formed of the same material.

17. The liquid crystal panel of claim 11 wherein said plurality of first wirings include a width expanded portion engaging at least one of said sealing material and said vertical conductive portion.

18. A liquid crystal panel comprising:
a first substrate having a plurality of first wirings formed thereon;
a second substrate having a plurality of second wirings formed thereon facing the first substrate;
a sealing material interposed between the first substrate and the second substrate and encapsulating a liquid crystal material therebetween; and
a vertical conductive portion interposed between the first substrate and the second substrate proximate a liquid crystal injection hole formed in the sealing material;
wherein the sealing material and vertical conductive portion include conductive particles dispersed therein conductively connecting the first plurality of wirings to the second plurality of wirings; and
wherein said sealing material terminates at a pair of spaced apart wirings of the plurality of first wirings to form the liquid crystal injection hole, the vertical conductive portion overlapping said pair of spaced apart wirings and any wiring of the plurality of first wirings formed therebetween.

19. A Liquid crystal panel including a liquid crystal between a first substrate having a plurality of first wirings and a second substrate having a plurality of second wirings, comprising:

a sealing material which is held between the first substrate and the second substrate, which has a liquid crystal injection hole for injecting the liquid crystal between both substrates, and in which conducting particles are dispersed at least in a portion of the sealing material where the plurality of first wirings and the plurality of second wirings face each other; and a vertical conduction portion which is installed proximate the liquid crystal injection hole and in a region substantially surrounded by the sealing material, the vertical conduction portion having conducting particles dispersed therein at least in a portion where the plurality of first wirings and the plurality of second wirings face each other;

wherein the plurality of first wirings extend in a direction from one edge having the liquid crystal injection hole formed in the sealing material toward another edge facing the one edge in a display region; and wherein among the plurality of first wirings, at least one first wiring, an end portion of which reaches a position corresponding to the liquid crystal injection hole on the first substrate and which does not face the sealing material, includes a portion facing the second wiring with the vertical conduction portion therebetween.

* * * * *